(12) United States Patent
Hensel

(10) Patent No.: US 9,681,769 B2
(45) Date of Patent: Jun. 20, 2017

(54) SAFETY SWITCH FOR CITRUS PRESS

(75) Inventor: Keith James Hensel, Lane Cove (AU)

(73) Assignee: BREVILLE PTY LTD, Alexadrria, New South Wales (AU)

( * ) Notice: Subject to any disclaimer, the term of this patent is extended or adjusted under 35 U.S.C. 154(b) by 1175 days.

(21) Appl. No.: 13/306,897

(22) Filed: Nov. 29, 2011

(65) Prior Publication Data
US 2012/0103202 A1 May 3, 2012

Related U.S. Application Data

(62) Division of application No. 10/575,847, filed on Apr. 14, 2006, now abandoned.

(51) Int. Cl.
- *A47J 43/14* (2006.01)
- *A47J 19/02* (2006.01)
- *A47J 43/07* (2006.01)

(52) U.S. Cl.
CPC ........... *A47J 19/02* (2013.01); *A47J 43/0761* (2013.01)

(58) Field of Classification Search
USPC ...................................... 99/501–513; D7/665
See application file for complete search history.

(56) References Cited

U.S. PATENT DOCUMENTS

| | | | | |
|---|---|---|---|---|
| 438,069 A * | 10/1890 | Easley | ............................ | 99/508 |
| 585,134 A * | 6/1897 | Templin et al. | ................ | 99/507 |
| 1,838,626 A * | 12/1931 | Hurst | ................ | 99/515 |
| 1,933,621 A * | 11/1933 | Elliott et al. | .................... | 99/507 |
| 2,257,430 A * | 9/1941 | Savitz et al. | .................... | 99/508 |
| 2,588,906 A * | 3/1952 | Clark | .......................... | 100/98 R |
| D187,451 S * | 3/1960 | Schier | ............................ | D7/665 |
| 3,580,314 A * | 5/1971 | Besora | ............................ | 99/504 |
| 4,530,277 A * | 7/1985 | Matsumoto | .................... | 99/506 |
| 4,706,559 A * | 11/1987 | De Zarate | ....................... | 99/504 |
| 4,716,823 A * | 1/1988 | Capdevila | ....................... | 99/510 |
| D366,992 S * | 2/1996 | Ruck | .............................. | D7/665 |
| 5,570,629 A * | 11/1996 | Ruck | .............................. | 99/506 |
| D399,709 S * | 10/1998 | Lee | .................................. | D7/665 |
| 6,135,018 A * | 10/2000 | Yu et al. | ......................... | 99/504 |
| 6,138,556 A * | 10/2000 | Yu et al. | ......................... | 99/504 |
| 6,265,010 B1* | 7/2001 | Franco | .......................... | 426/420 |
| 2003/0179645 A1* | 9/2003 | Seul | .............................. | 366/142 |

* cited by examiner

*Primary Examiner* — Dana Ross
*Assistant Examiner* — Brandon Harvey
(74) *Attorney, Agent, or Firm* — Michael Molins

(57) ABSTRACT

A motorised citrus press has a reamer and an actuating arm. The arm supports a fruit dome. The movement of the arm causes the activation of a first switch and the reamer is associated with a second switch. The motor receives electrical power only when both the first and second switches cooperate.

19 Claims, 24 Drawing Sheets

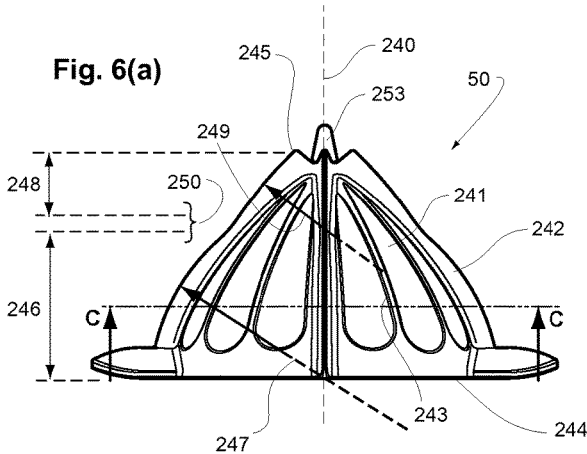
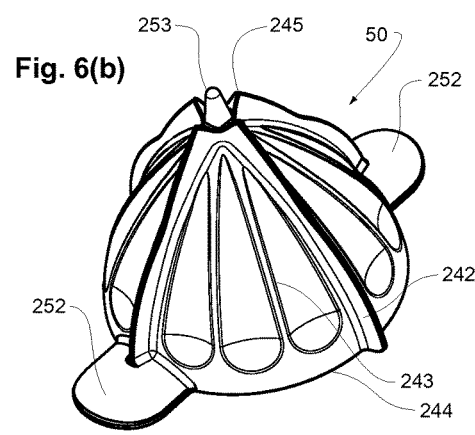
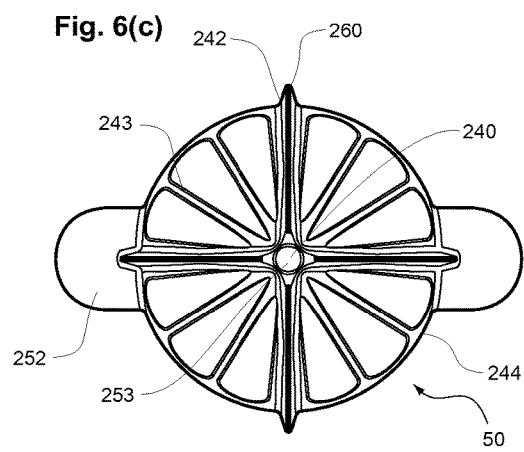
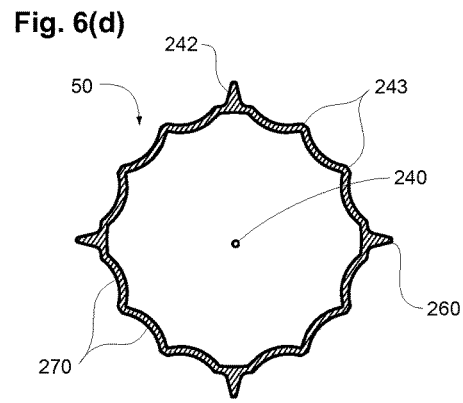

SAFETY SWITCH FOR CITRUS PRESS

FIELD OF THE INVENTION

The invention pertains to juicers and more particularly to a citrus juicer with improvements that contribute to ease of use and juicing efficiency.

BACKGROUND OF THE INVENTION

A wide variety of citrus juicers are known, including fully manual, fully automatic and motorized reamer varieties. In one known variety, a motorized reamer is supported by a housing. An inverted dome is carried by a simple pivoting arrangement and the dome is adapted to receive a half of a citrus fruit. The pivoting action of the dome brings the citrus half into contact with the rotating reamer. Continuous manual pressure against the dome squeezes the fruit against the reamer and the fruit's juice is thereby extracted and collected. In this arrangement, the movement of the inverted dome is generally an arc of a circle whose centre is defined by a simple hinge that connects the inverted dome to the housing.

This type of motion, by definition, creates uneven contact pressure between the citrus fruit and the reamer and therefore leaves portions of the fruit intact. Further this type of motion is susceptible to knocking the fruit from the top of the reamer before the fruit is fully encapsulated by the dome. The travel of the inverted dome can be made more linear if the pivot point is moved a significant distance from the dome, however this is generally not practical.

Further, the manual pressure required to bring the fruit into contact with the reamer does not benefit from a significant mechanical advantage. Therefore, the device is sometimes difficult to use particularly for persons with limited mobility, dexterity or strength.

Further, reamer design is important to the ease of use, efficiency and versatility of a citrus juicer. The reamer is intended to penetrate a half of a citrus fruit. Pressure between the fruit and reamer and relative rotation between the two results in the separation of the juice from the fruit. The exterior surface of the reamer normally carries ribs for the purpose of rupturing the juice sacks that are characteristic in citrus fruit.

Some juicers utilize the interior of a dome as a means of conveniently applying pressure to the exterior of the citrus fruit being juiced. Other juicers rely on hand pressure. In any event, a single prior art reamer has generally not been well adapted to the job of extracting juice from a wide variety of citrus fruit types. Reamers which are suitable for limes are rarely, if ever, suitable for larger oranges and grapefruits. Thus, prior art citrus presses are known to have interchangeable reamers.

Additionally, spouts are used on a variety of appliances. In preferred embodiments, juice that accumulates in a collector is dispensed through an opening to a spout that dispenses the collected juice into a container such as a drinking glass. Unless the opening in the juice collector can be sealed, the removal or interchange of a glass or the removal of the collector for cleaning or other purposes will result in undesirable leakage through the opening.

Forms of pivoting sealing spouts are known but each of the known prior art pivoting spouts requires the use of some form of resilient spring or detent mechanism or other mechanical complexity in order that the spout can be maintained in both a sealed and a dispensing position.

OBJECTS AND SUMMARY OF THE INVENTION

It is an object to provide a citrus juicing device that is efficient and versatile.

Accordingly, there is provided a motorised citrus press having an actuating arm that is hinged to a housing. The arm is supported for movement toward the reamer. The arm supports a fruit dome. The movement of the arm causes an activation of a first switch that is associated with the press's motor. The reamer is associated with a second switch. Pressure on the reamer activates the second switch. The motor receives electrical power from the reamer only when both the first and second switches cooperate.

BRIEF DESCRIPTION OF THE DRAWING FIGURES

Figure 6E:
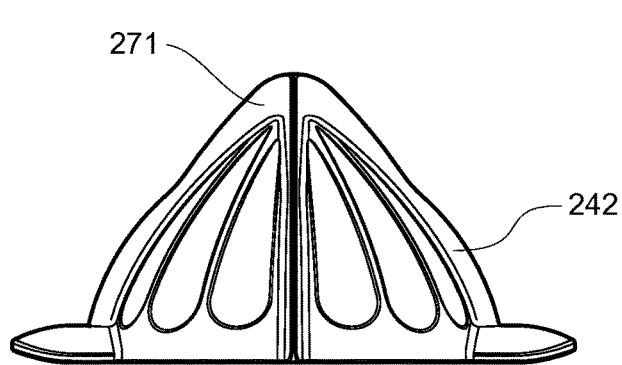
Figure 6F:
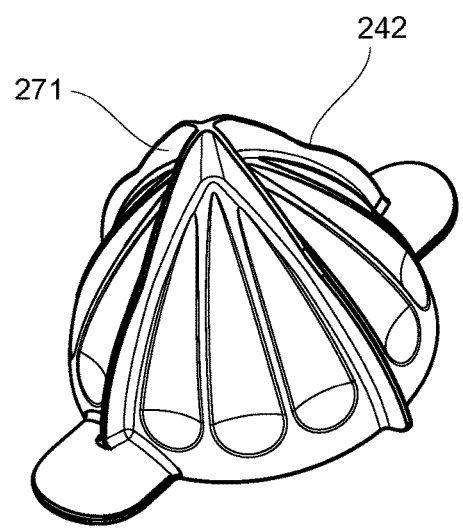
Figure 6G:
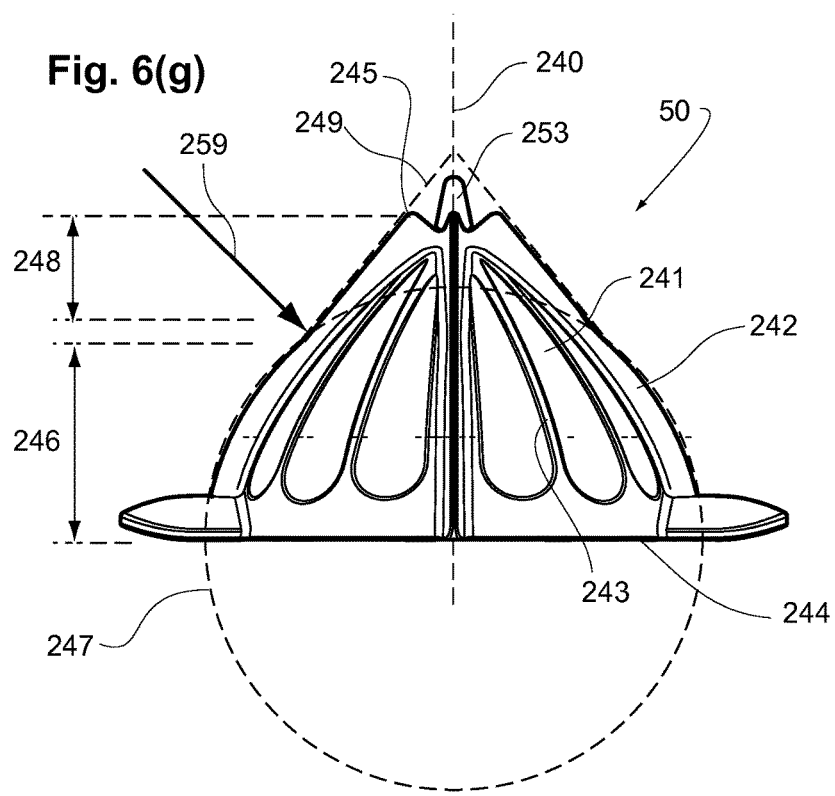
Figure 6H:
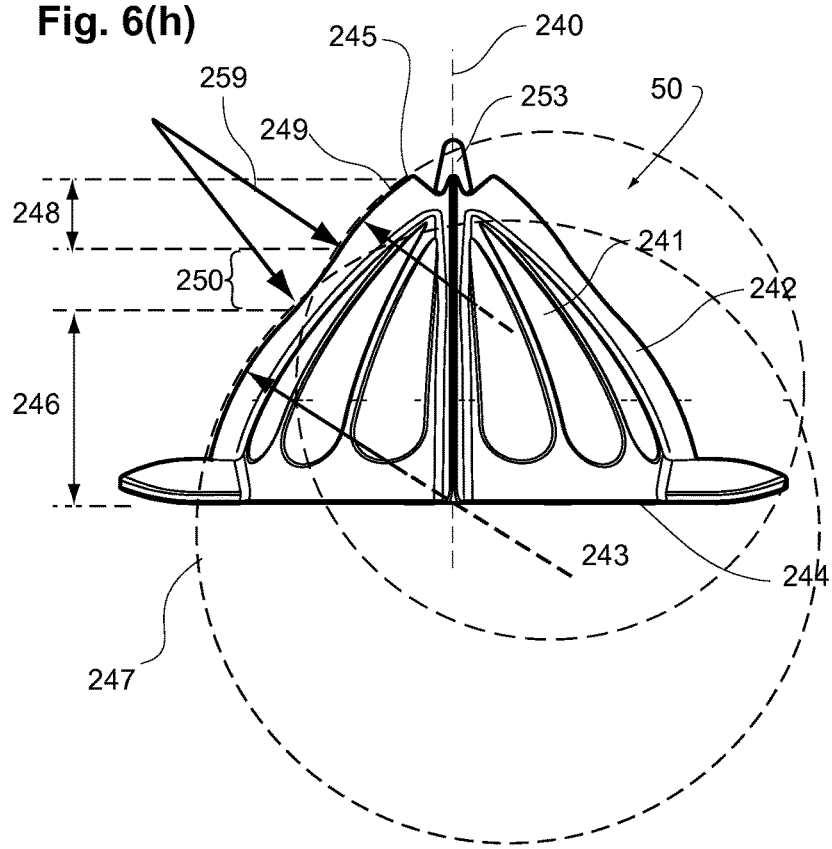
Figure 12:
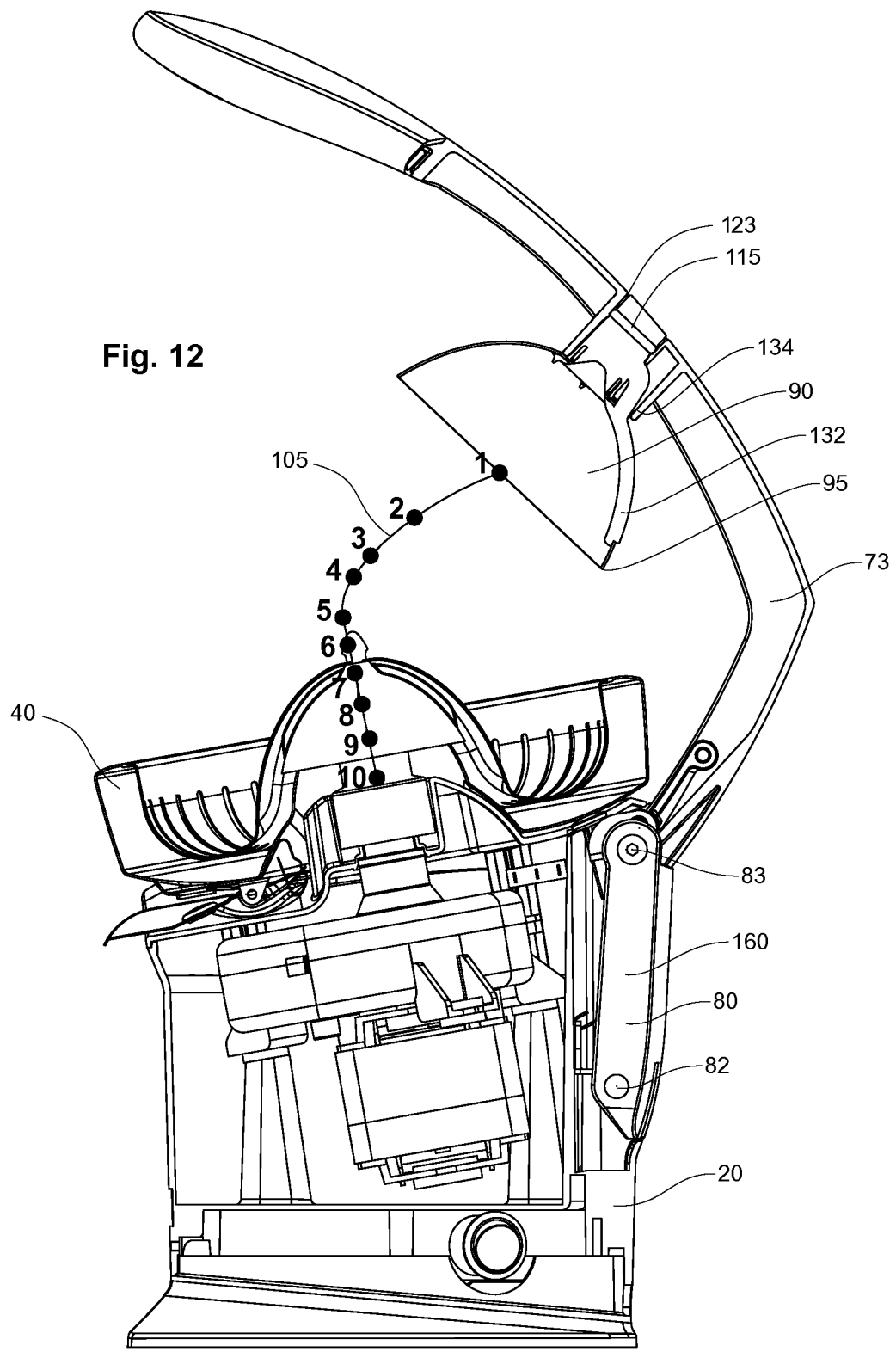
Figure 13:
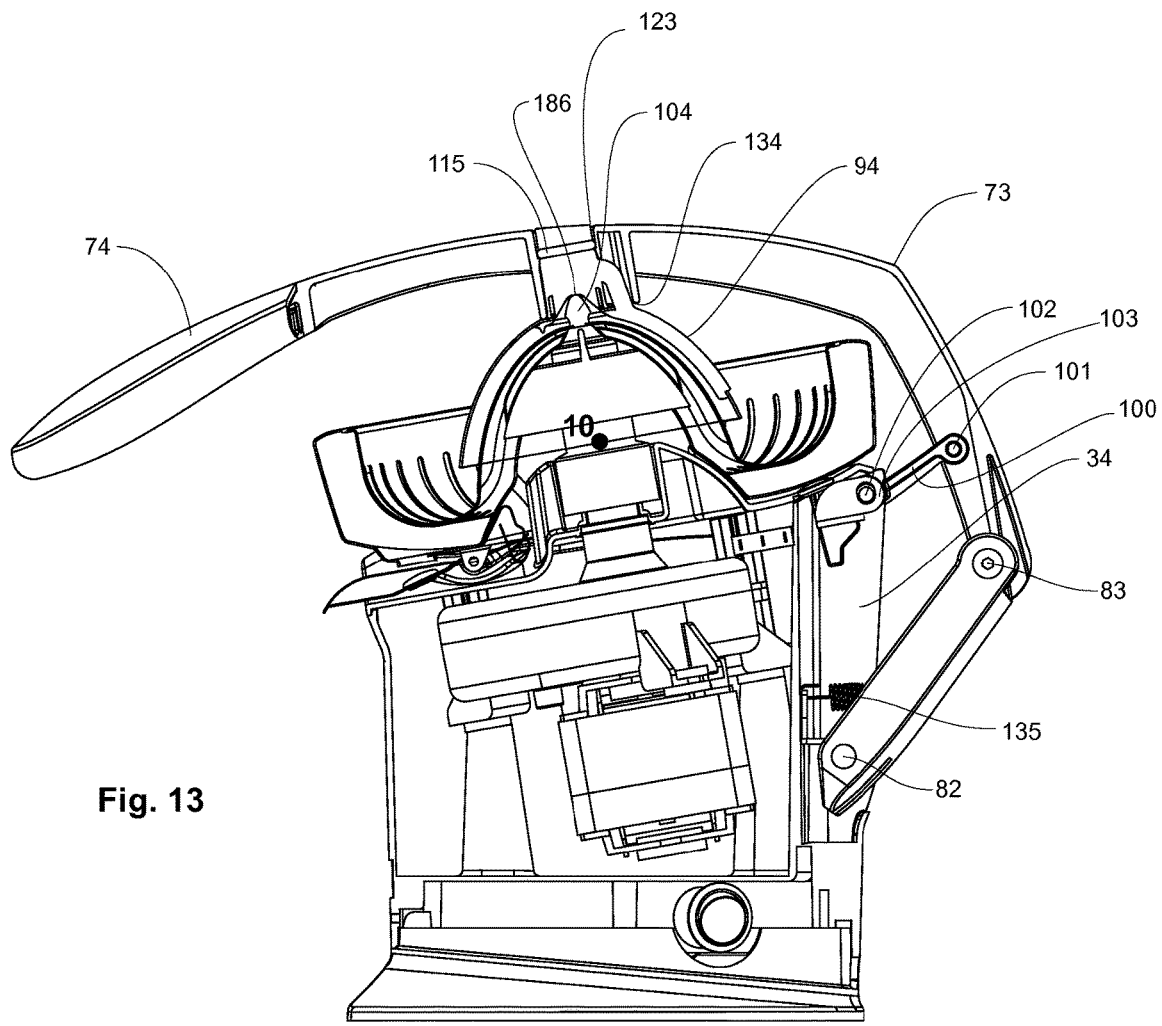
Figure 14:
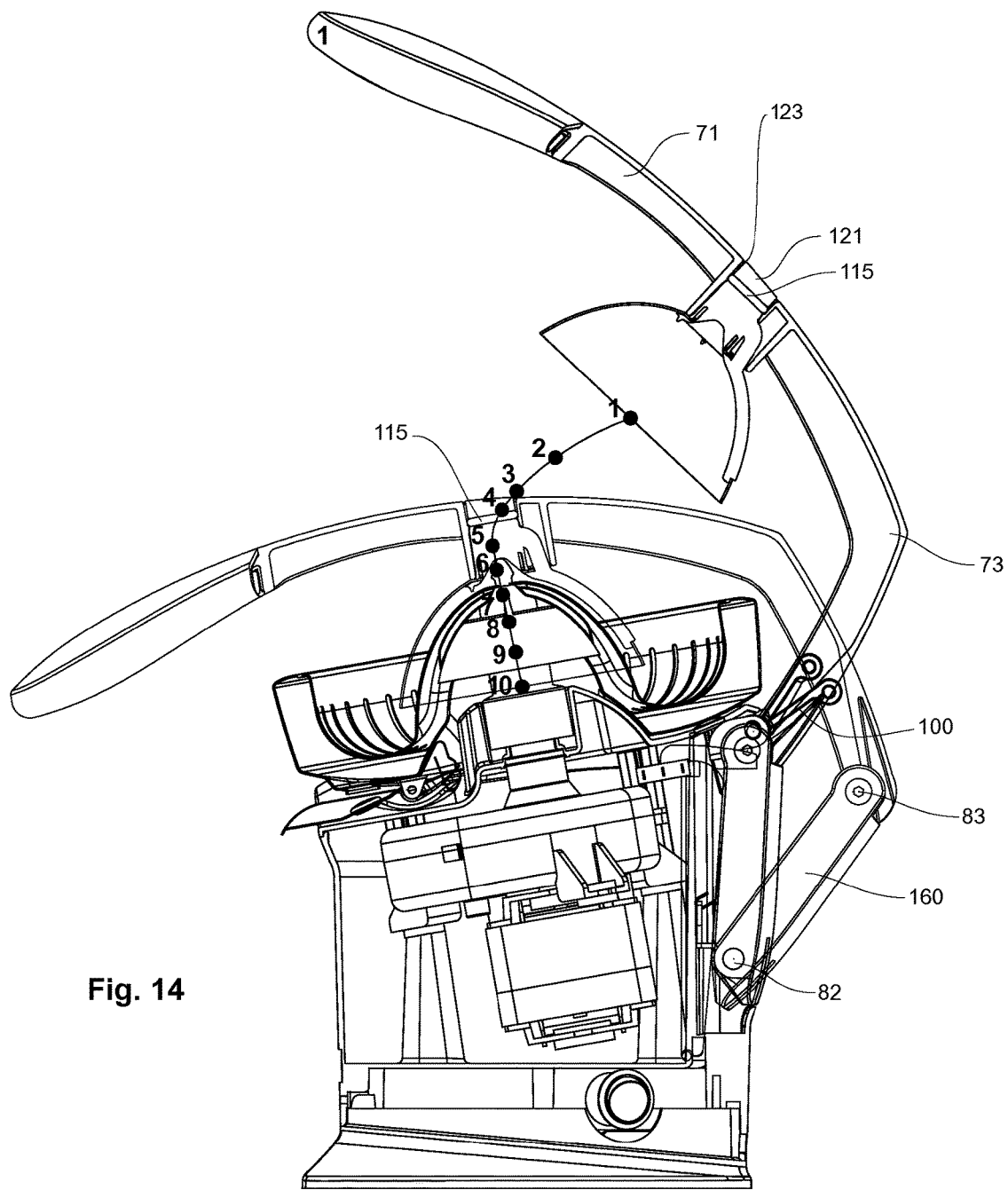
Figure 15:
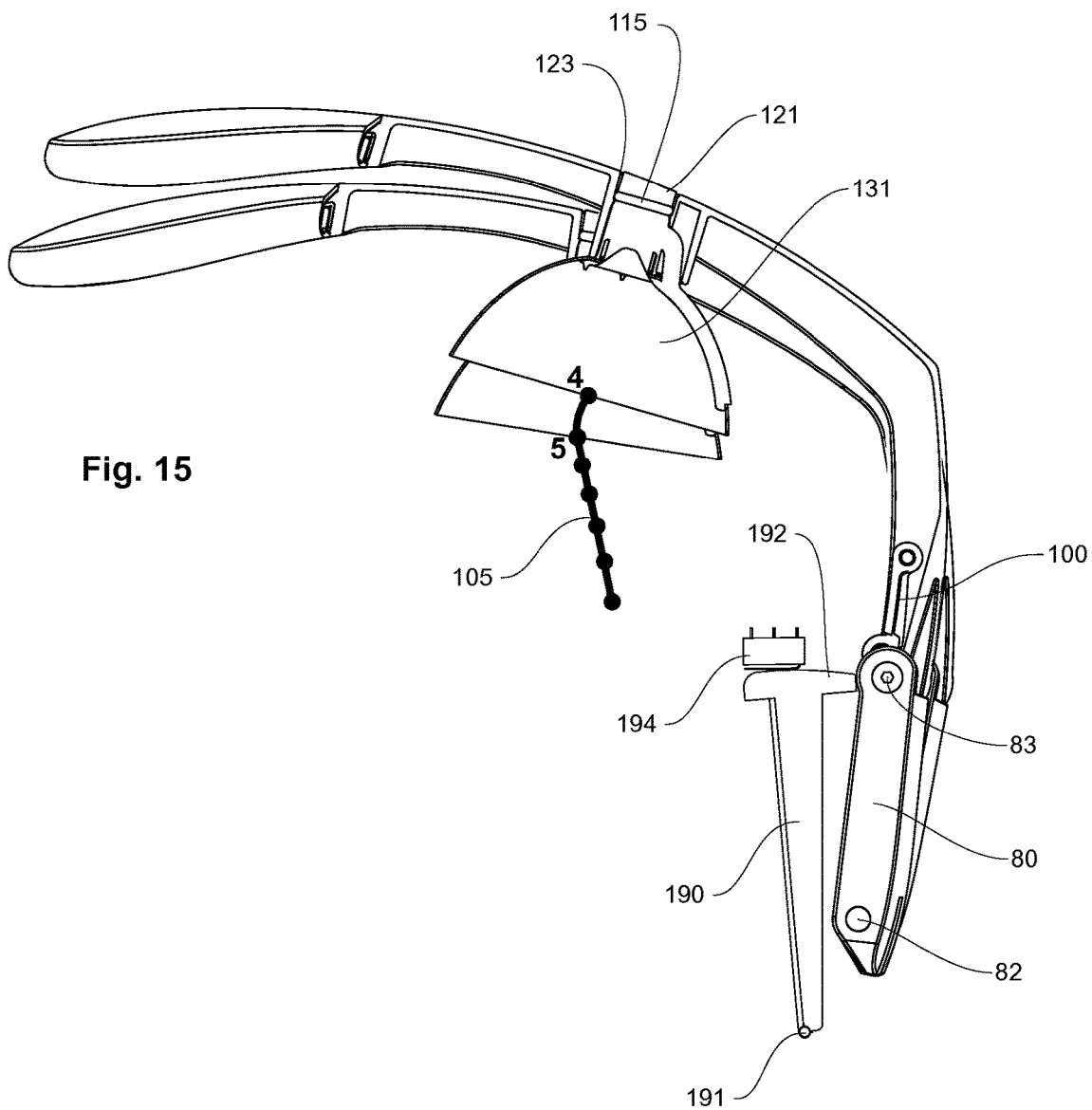
Figure 16:
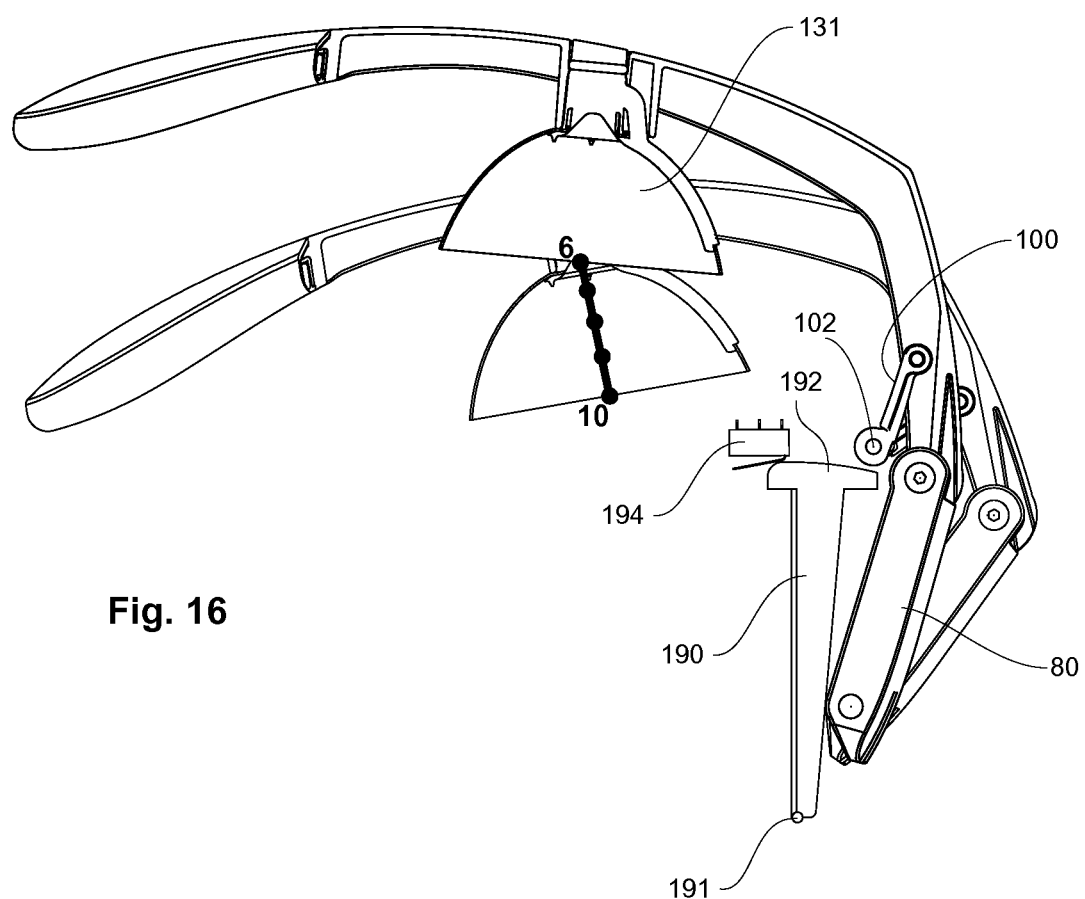
Figure 17:
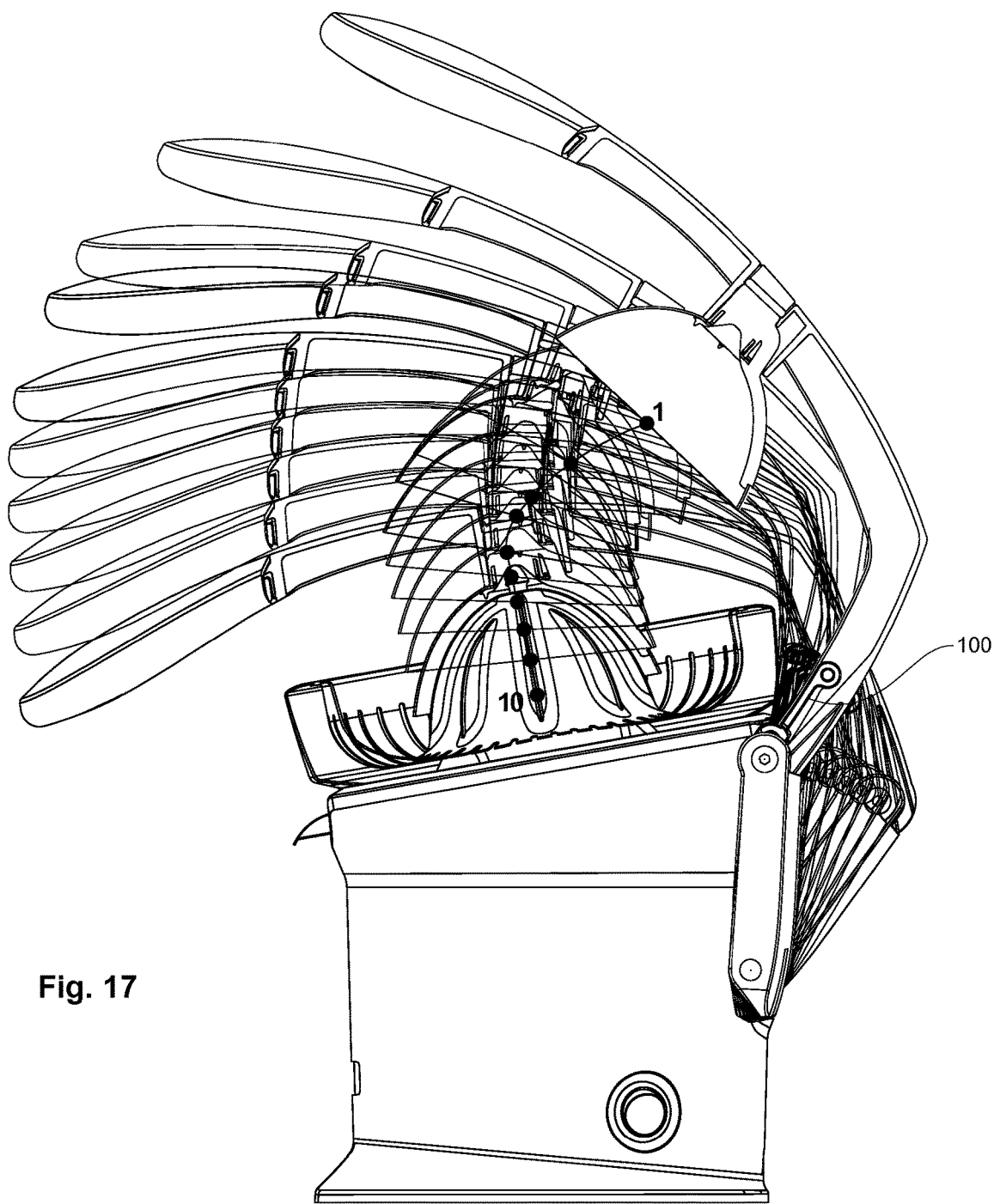
Figure 18:
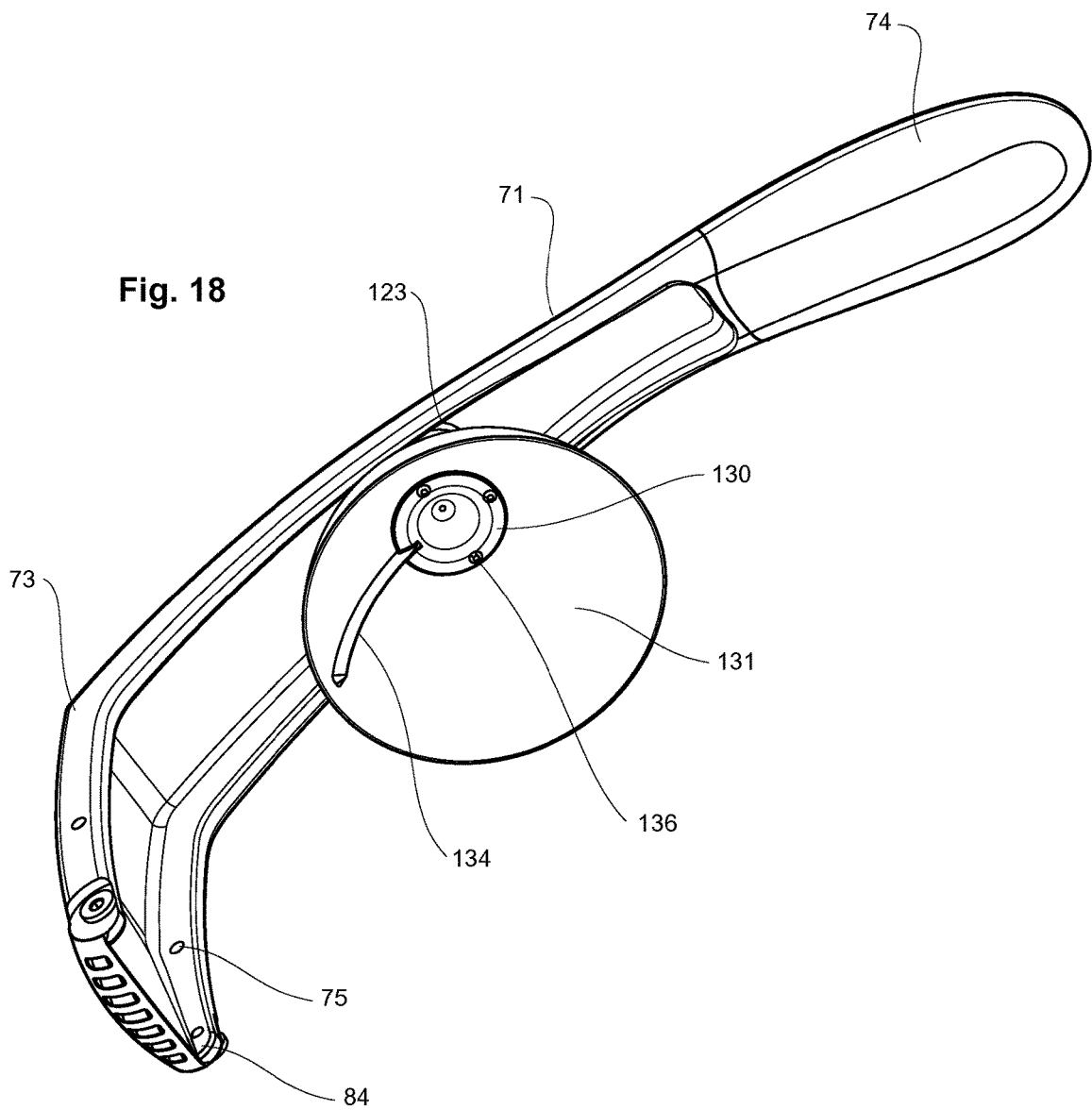
Figure 19A:
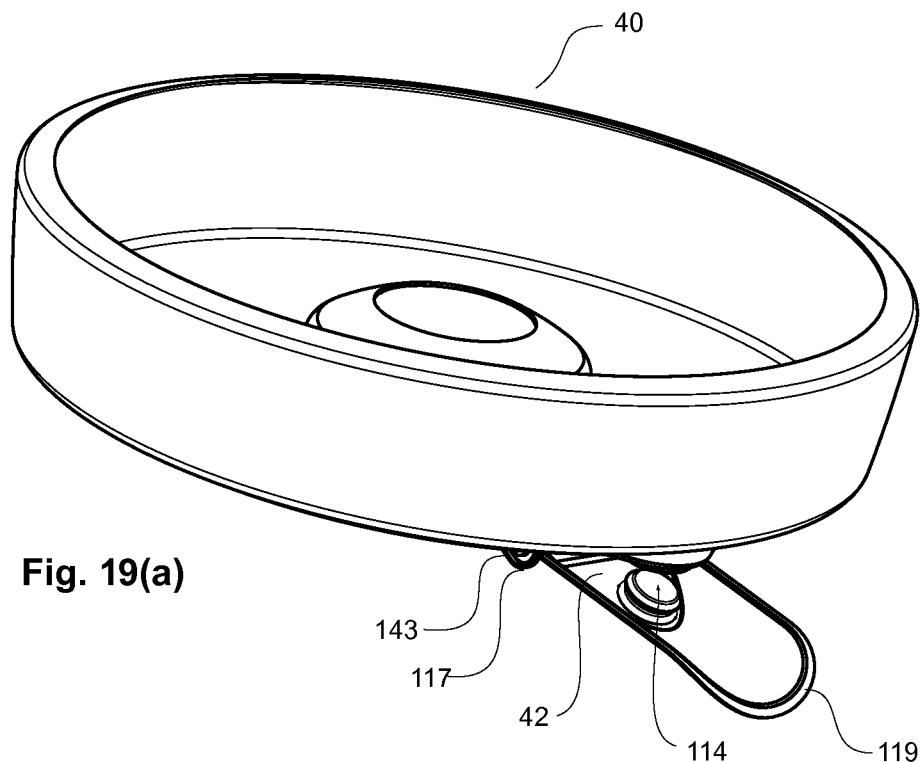
Figure 20A:
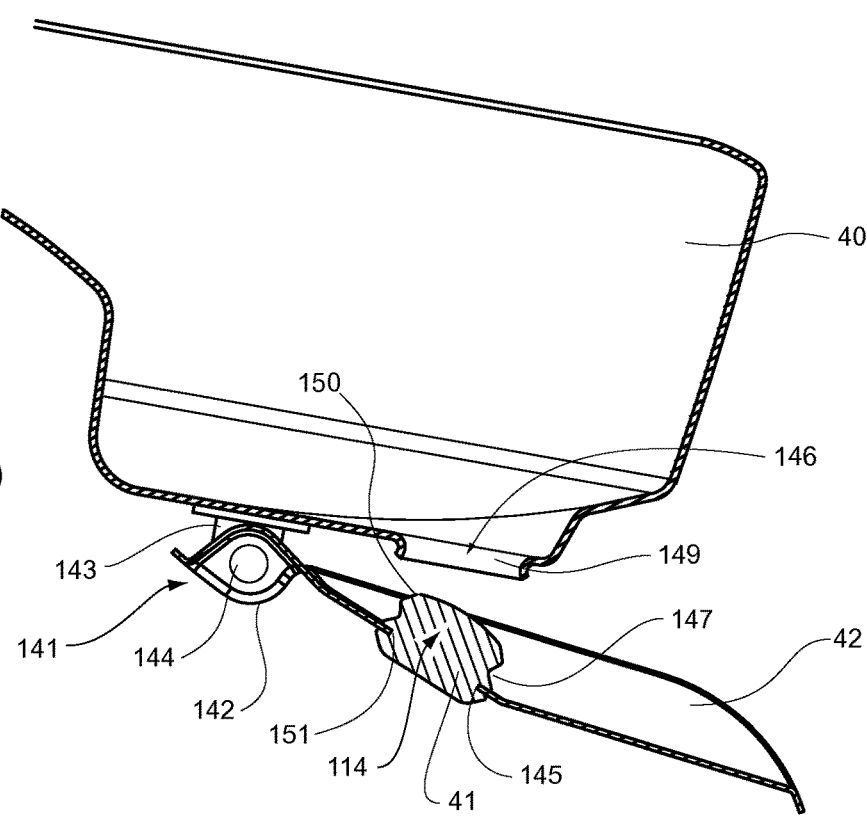
Figure 21A:
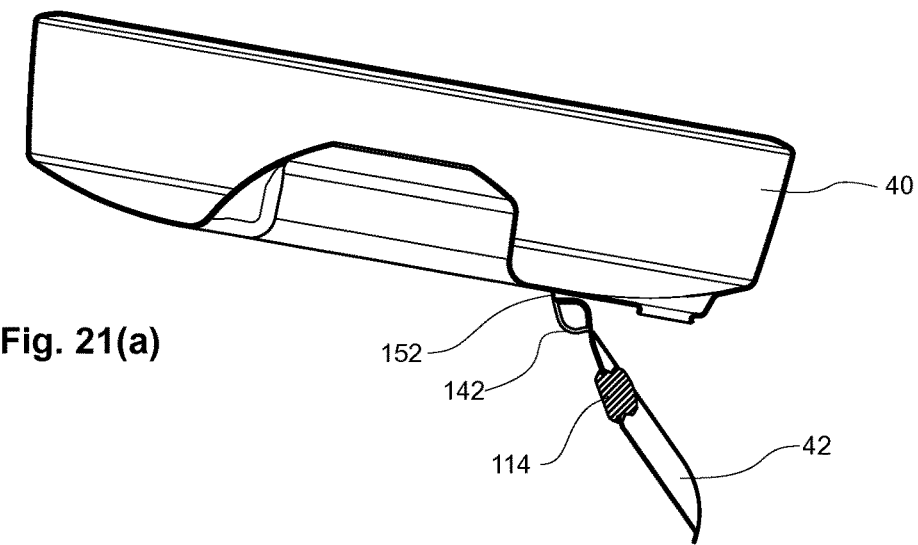
Figure 21B:
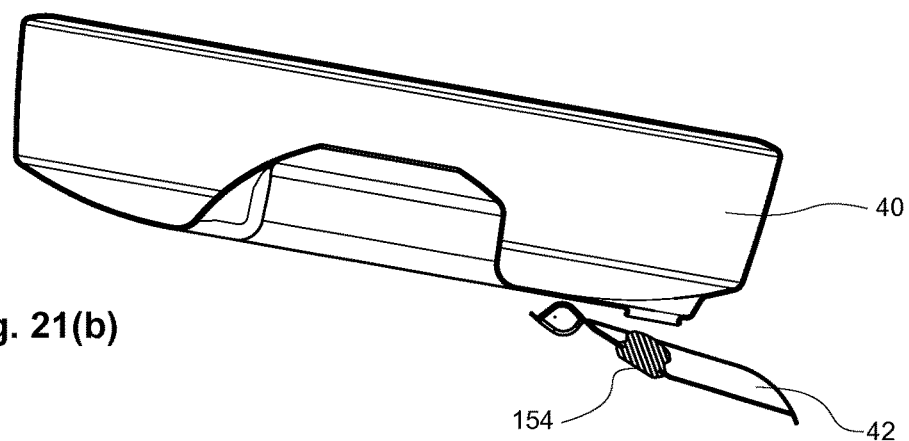
Figure 21C:
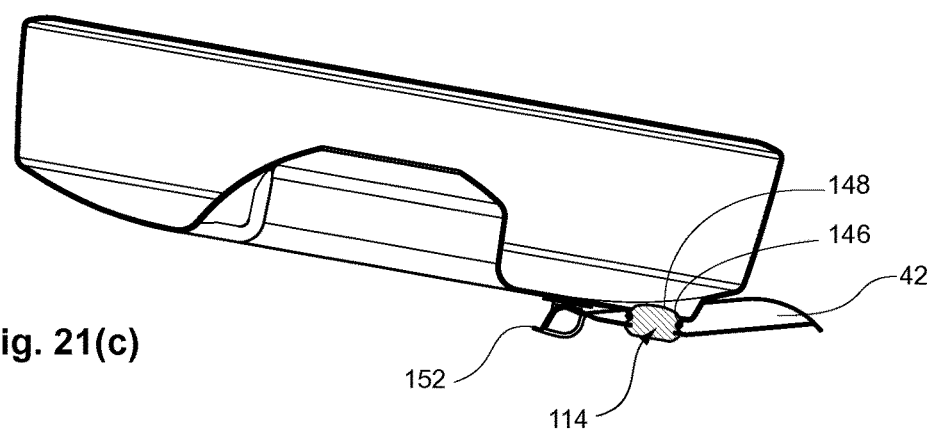
Figure 22:
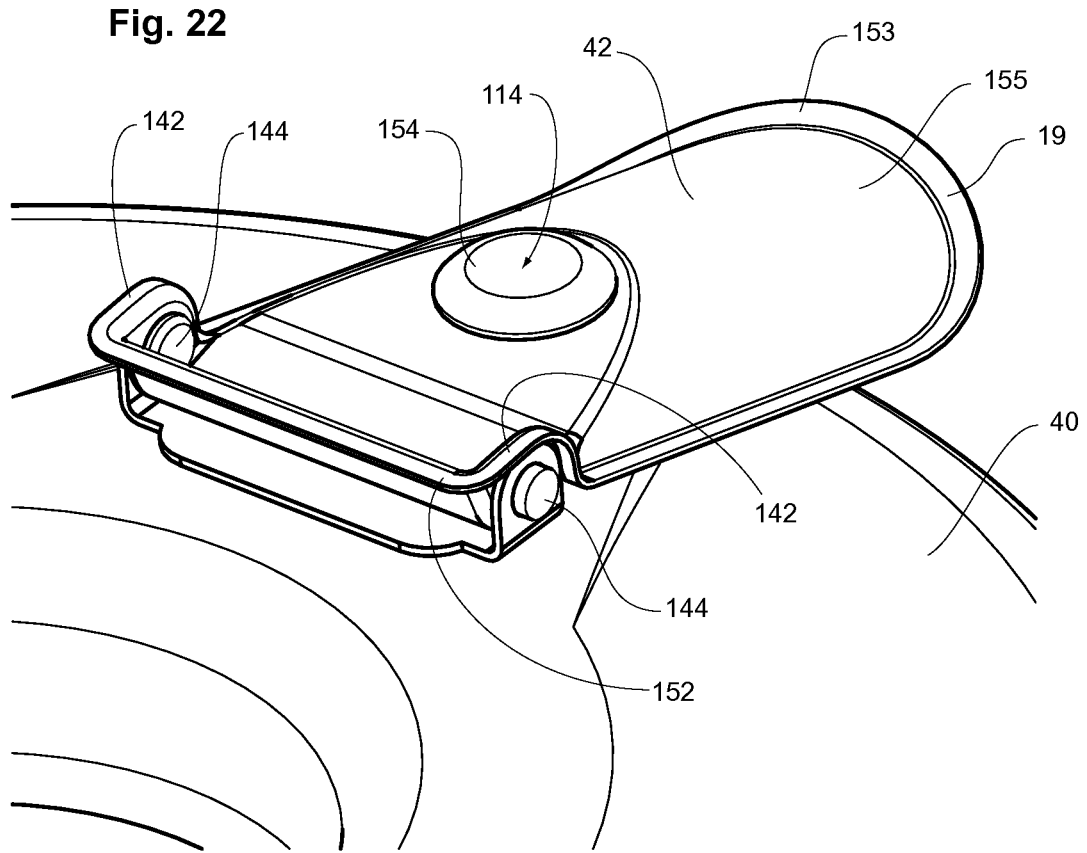

FIGS. 6(a) to (d) are side, perspective, plan and sectional views of a second embodiment of the reamer;

FIGS. 6(e) and (f) are side and perspective views of another reamer embodiment;

FIGS. 6(g) to (h) are side views of other embodiments of the reamer;

FIGS. 7(a) to 7(d) are bottom plan, perspective, side elevational and cross-sectional views of a dome;

FIGS. 8 to 11 are cross-sectional views of different citrus fruits utilized with a reamer and dome;

FIG. 12 is a side elevation, partially sectioned, showing the main arm and fruit dome path;

FIG. 13 is a partially cross sectional view of a citrus juicer showing the final position of the actuating arm;

FIG. 14 is a partially cross sectional view of a citrus juicer illustrating the dome and fruit travel path;

FIG. 15 is a side view of the actuator arm with the micro switch safety interlock activated, preventing reamer rotation;

FIG. 16 is a side view depicting the actuating arm with the micro switch safety interlock released allowing reamer rotation;

FIG. 17 is a partially cross-sectioned view of the actuating arm showing the initial, intermediate and final positions of the actuating arm;

FIG. 18 is a perspective view of the underside of the arm and fruit dome;

FIGS. 19(a) and (b) are perspective views of a juice collector with spout in a dispensing and sealed position respectively;

FIGS. 20(a) and (b) are cross sectional views of the juice collector and spout depicted in FIG. 19(a) and (b);

FIGS. 21(a) to (c) are side elevations, partially sectioned depicting the juice collector and spout of the present invention; and FIG. 22 is an inverted perspective view of a spout depicting the bottom of the elastomeric seal.

BEST MODE AND OTHER EMBODIMENTS OF THE INVENTION

Overview

Figure 1:
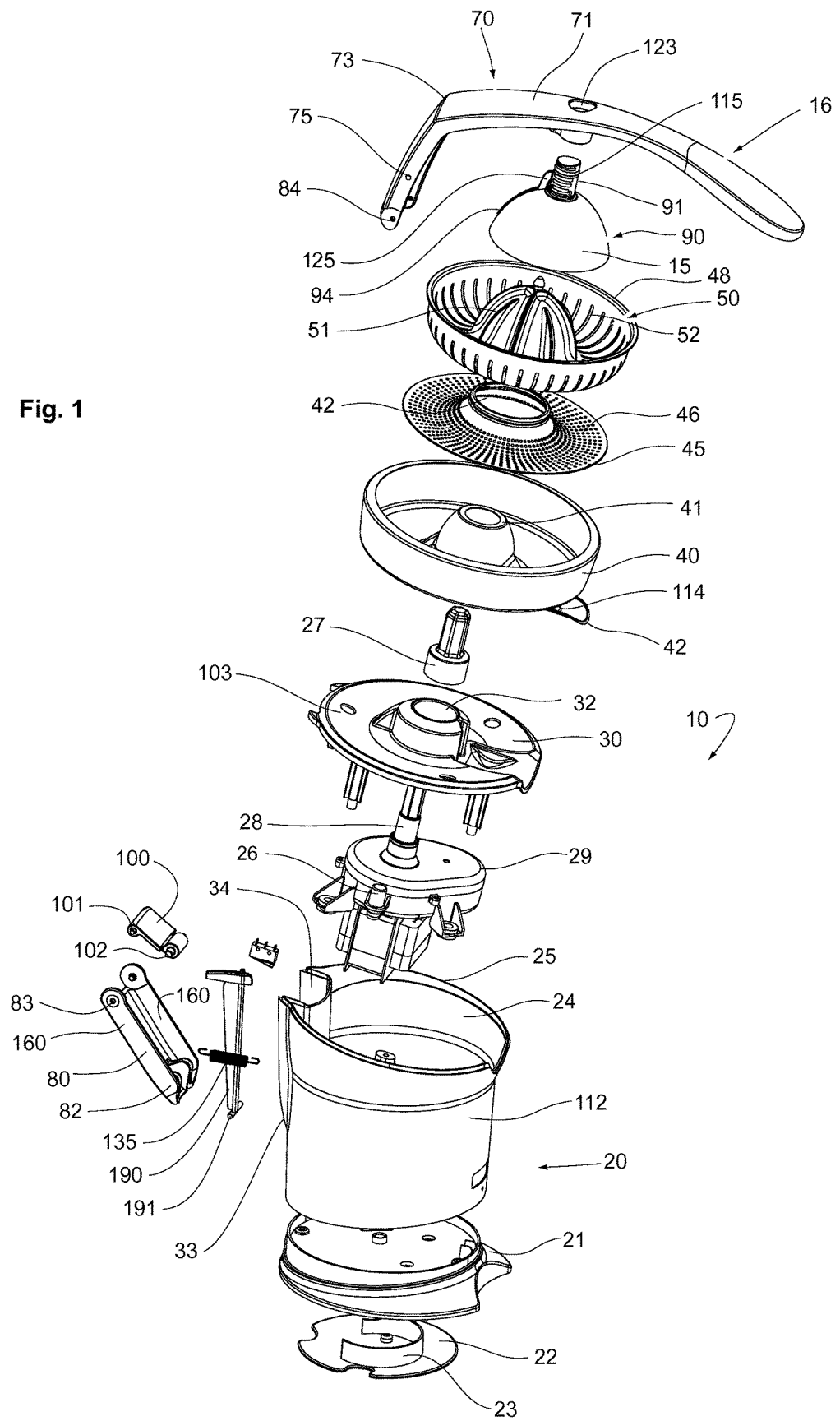
FIG. 1 is an exploded perspective of a motorised citrus juicer according to the teachings of the present invention.

As shown in FIG. 1, one embodiment of a citrus press or juicer 10 comprises a reamer 50 supported by a housing 20, with a juice collector 40 therebetween. In this example the reamer includes an integral strainer 48 and both are preferably pressed from sheet metal. In the motorized embodiment shown in FIG. 1, the housing also contains a motor and gearbox 29 which drive a main shaft 28 attached thereto to rotate the reamer 50. In a preferred embodiment, the fruit is pressed onto the reamer 50 by applying force through an actuating arm 70 onto a dome 90 that is formed to hold the fruit substantially stationary against the reamer, while the reamer 50 rotates, to extract the juice from the flesh of the fruit. The extracted juice is collected in the juice collector 40 until a seal 114 attached to the spout is removed from the discharge opening to allow the juice to flow into a glass or container below. The juicer 10 may optionally include a pulp filter 45 for example, as a separate part between the reamer and the collector.

The housing 20 is constructed to contain a motor and gearbox 29. In preferred embodiments, the motor's main or output shaft 28 mounted at a slight angle from vertical. The housing 20 contains an upper collar 24 having an upper rim 25 that is similarly inclined. The main housing 20 is attached to a forward extending foot molding 21 with a central gap. The gap allows a collector such as a glass to be positioned under the spout. The foot molding has mounted beneath it a cord wrap 22 that includes a spacer 23 around which the unit's power cord can be encircled.

The motor and gearbox 29 are located and contained within the housing 20 by a top cap 30 through which the main shaft protrudes. The motor and gearbox include a micro switch activator 26. The activator serves to engage the electric motor when the main shaft 28 is depressed and when power is available. Movement of the main shaft 28 activates an internal lever that in turn depresses the micro switch 26 in a manner that is known in devices of this kind. The main shaft 28 enjoys a travel of about 3 mm between activator's deactivated and activated positions. This allows for the reamer to remain stationary until a threshold pressure is applied by a user. The pressure threshold of the micro switch activator 26 has a suitable sensitivity to allow for the weight of the fruit to be loaded onto the reamer without activating the micro switch. In some embodiments the switch 26 is de-activated by a lock-out switch associated with the arm 70.

A central opening 32 in the housing top cap 30 receives an optional driveshaft cap 27 that goes over the main shaft 28 and extends through the juice collector 40. The juice collector 40 comprises a unitary molding having a central elevation with an opening 41 for admitting the driveshaft cap.

Juice in the juice collector 40 passes along a spout 42. The spout 42 is pivoted with respect to the under-side of the juice collector and includes a stopper 114 (see FIG. 2) which fits snugly into a through opening which is formed in the base of juice collector adjacent to the spout. When the spout is in an upper position, the opening is blocked by the stopper 114 and when the spout 42 is lowered, juice is free to flow through the opening, and down the spout. The opening and spout are located at a low portion of the juice collector when it is installed on the inclined driveshaft cap.

In one embodiment, the driveshaft cap 27 passes through the juice collector 40 and through an optional stationary pulp filter 45. The pulp filter contains an enlarged main opening and a number of perforations 46 which allow juice but limit the flow of pulp. The rotation of a reamer 50 (with the integral filter basket) in proximity to the filter 45 helps to unblock the perforations 46 in the filter 45. The pulp collector 45 includes a central opening 47 that the driveshaft cap 27 passes through to enter a cooperating opening formed on the underside of the juicing reamer 50. The juicing reamer 50 includes a central mound 51 surrounded by radial slots 52, primarily for trapping seeds.

Fruit is brought into contact with the reamer 50 by using a specially configured actuating arm 70 (see FIGS. 12-18). The actuating arm includes a main arm 71 in which is formed an opening 123 which receives the stub 91 of a fruit dome 90. The fruit dome 90 includes an internal rib 134 and/or pins 136 which prevents the fruit half 110 from rotating under the influence of the rotating reamer. The fruit dome 90 also includes an external rib 125 that engages a slot in the main arm 71 and prevents the dome from rotating. Thus the actuating arm is an assembly including the main arm and links in the form of the major pivot arm 80 and the minor pivot arm 100 as will be explained.

Figure 2:
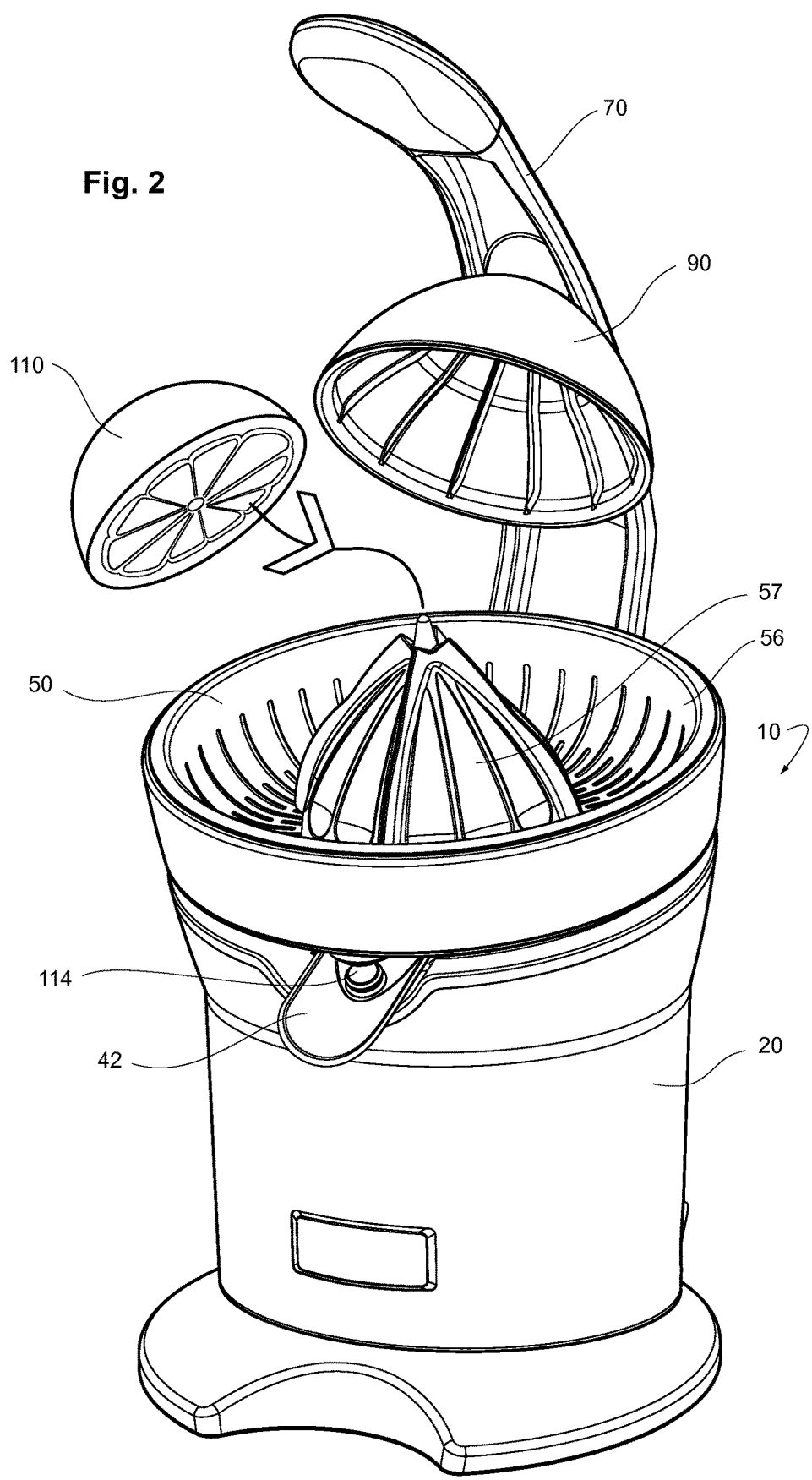
FIG. 2 is a perspective view of the juicer depicted in FIG. 1.

As shown in FIG. 2, an alternate embodiment provides a cast reamer 57 and separate strainer 56 as will be explained.

Fruit Reamer

Figure 3:
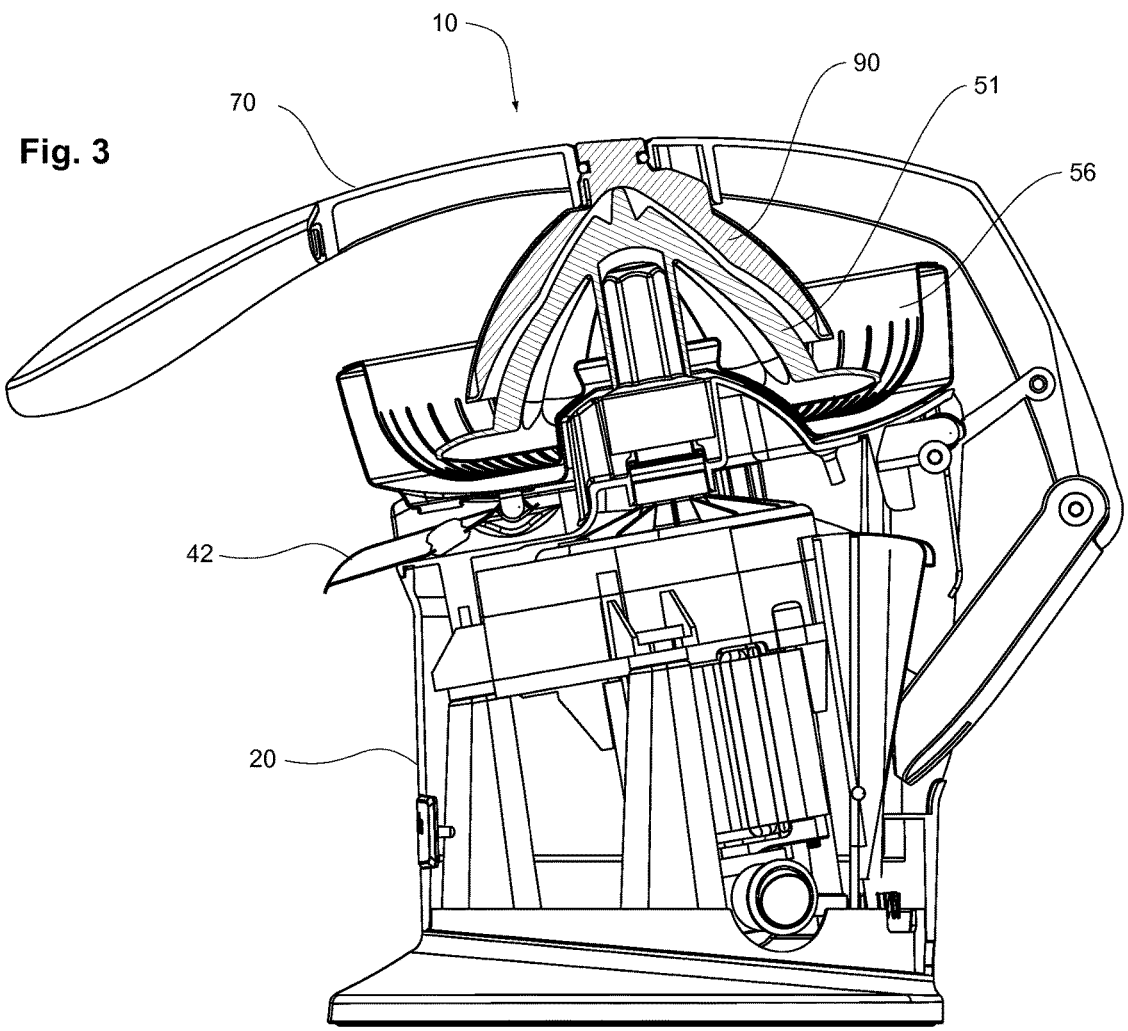
FIG. 3 is a cross-sectional view of a juicer with detachable reamer.
Figure 4:
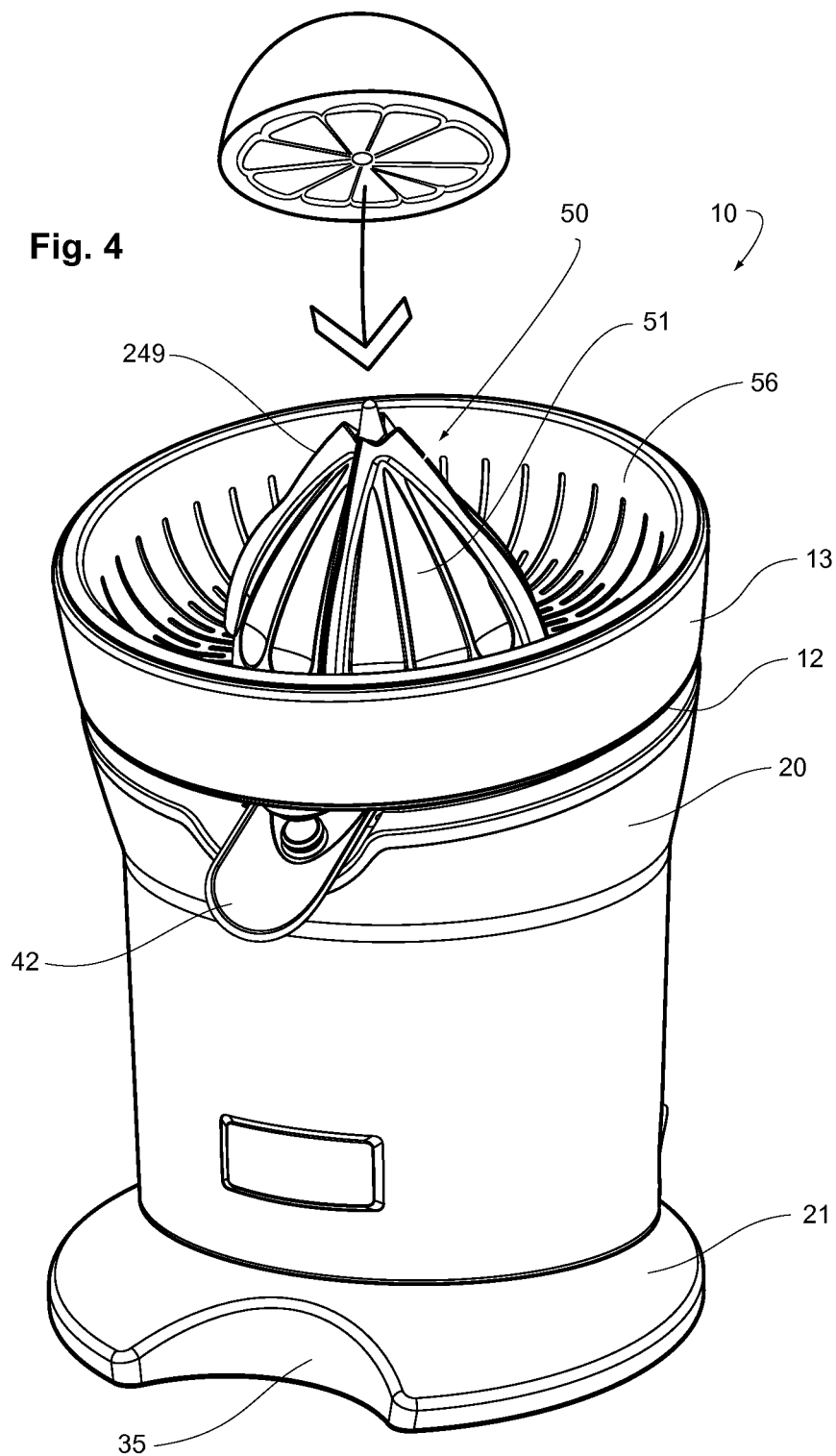
FIG. 4 is a perspective view of the reamer and base without actuating arm.

In, for example, FIGS. 1, 2 and 3, the reamer 50 (with or without integral strainer) works in co-operation with a fruit dome 90 to form the citrus press. However, as shown in FIGS. 6(e) and 6(f), a reamer according to the invention need not utilize a dome 90 or handle 70, in fact, it need not include a motor or motorized base in the sense that certain novel features which will be described in reference to the reamer are equally applicable to all varieties of citrus juice extraction devices.

Figure 5:
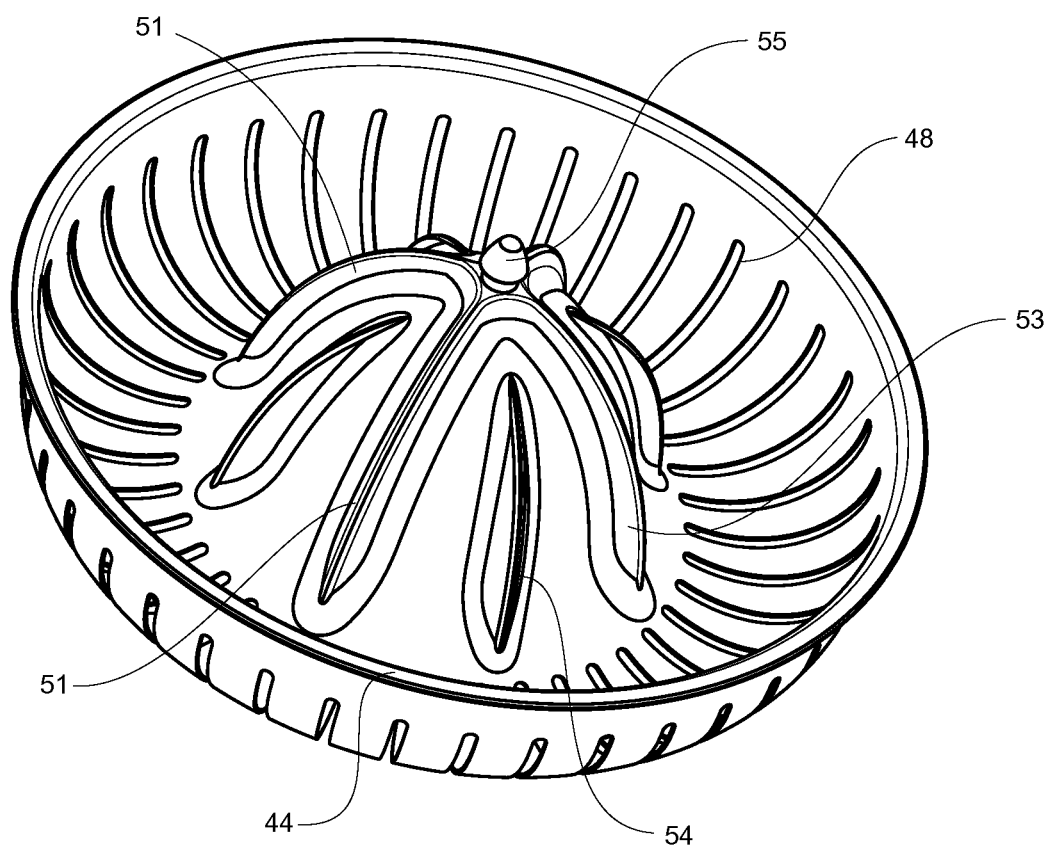
FIG. 5 is perspective view of one embodiment of a juicing reamer.

In one embodiment as shown in FIG. 5, a central mound 51 of the reamer 50 includes full length ridges 53 as well as partial length radial ridges 54. The central mound 51 further comprises an optional pin 55 that is intended to hold the fruit in place as it is loaded onto the reamer. This embodiment is pressed from a sheet and includes an integral surrounding strainer 48 with radial slots 52.

It should be considered that the pin 55 and rib tip spikes 245 (see FIG. 6a) are primarily used in conjunction with a fruit dome. A manual reamer may omit these features (see FIGS. 6(e) and (f)).

For the purposes of this specification and the claims that follow, a profile (in relation to a rib or reamer) means a section along the length of a rib or reamer which when seen in side view, is separated from other sections by a distinct visual feature. A feature that can separate adjacent profiles from one another includes an inflection point, a discontinuity (being a corner or sharp change in curvature), or a transition or blend that visually separates one section from the other. In general, reamer profiles have functional attributes that, according to their size and location on the reamer, adapt a section to suit a particular sized citrus fruit. A compound profile refers to two or more different, successive profiles deployed in a single rib or reamer.

As shown in FIGS. 6a to 6d a dual profile embodiment of the reamer 50 is seen as having a longitudinal axis 240 of rotation. The reamer 50 has a domed rib supporting surface 241 and main or primary ribs 242. The supporting surface 241 may incorporate lower or secondary ribs 243 located between the primary ribs 242. In this example, the primary ribs 242 are four in number and extend above the main surface 241 from the top of the reamer all the way down to the lower edge 244. Each primary rib may incorporate an elevated projection 245 or spike at the apex of the ribs that serves to stabilize the fruit during juicing operations. The central spike 253 acts as a spacer between the descending fruit dome 90 and the juicing reamer 50. This ensures that the fruit dome cannot interfere with the ribs on the reamer.

The lower part 246 of the reamer towards the base of the ribs has a rib profile that operates on larger fruits such as oranges and grapefruits. We can define the longitudinal radii 247, 249 as the radius of a circle that is in the same plane as the longitudinal axis 240 and which therefore sweeps out a profile in the same plane as the longitudinal axis 240.

The lower profiles of the ribs 242 have a longitudinal radius 247 which approximates the radius of large orange or grapefruit.

An upper profile of the primary ribs 248 will also make contact with large fruit but must also allow for the efficient juicing of limes, small oranges and lemons. In this example, the upper rib profile is characterized by an upper longitudinal radius 249 that is greater than the lower longitudinal radius 247. Where the larger radius of the upper profile is large enough it may resemble a straight line.

The dual profile or compound profile reamer may also incorporate a transitional section 250 located between the upper profile 248 and the lower profile 246. This section smoothly blends the two profiles together using a concavity linking the upper and lower profiles and allows longer fruit to slide down the rib tips smoothly when pressed onto the reamer.

As shown in FIG. 6b, the reamer 50 may incorporate paddles 252. In this example, the paddles extend away from the lower rim 244 and are primarily used to sweep the strainer 50 free from extraneous pulp so that juice can flow more efficiently toward the spout 42.

As shown in FIGS. 6c and 6d, the primary ribs 242 are blade-like or tapered from root to tip and extend above the main exterior surface of the reamer. Each rib 242 has a radiused tip 260 that is intended to create relatively high surface pressures with the citrus fruit but not be so sharp as to be destructive to the fruit nor present a risk of injury. The intermediate or secondary ribs 243 subdivide the exterior surface of the reamer into concave scalloped areas 270. The secondary ribs 243 play some part in the juicing operation and also help to maintain low friction between the reamer and the fruit. The secondary ribs 243 assist the fruit in retaining its shape during the juicing process.

As shown in FIGS. 6(e) and 6(f) the spikes 245 are optional and the main ribs 242 can be joined above the domed surface to create a rounded cruciform 271 particularly suited to manual juicing.

As shown in FIG. 6(g) the upper profile 248 can be relatively flat rather than curved. When the profile is flat or nearly flat the profile can be seen as defining or having an acute apex angle (illustrated here at the joining of the dotted lines above the pin 253). In this illustration the upper profile is considered flat and the lower profile 246 is curved, having a radius corresponding to the approximate size of a large orange 247. The sharp style inflection point 259 is distinct and forms a visible transition between the flat upper profile and the curved lower profile.

As shown in FIG. 6(h) the upper and lower profiles can both be curved, with the longitudinal radius of the upper profile 248 being smaller than the longitudinal radius of the lower profile 246. Also illustrated are the two inflection points 259 being where the profiles transition between convex and concave along the length of the rib 242.

Fruit Dome

Figure 7A:
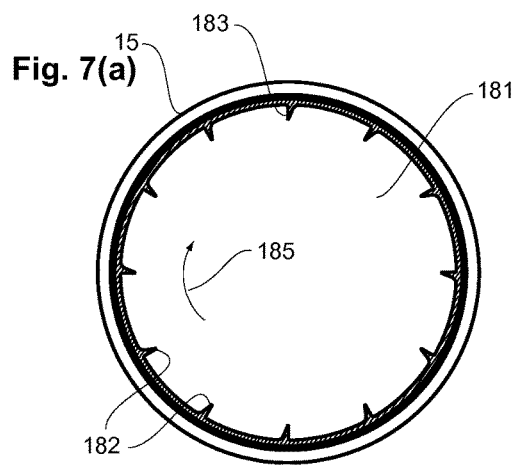

A fruit dome according to the teachings of the present invention is illustrated in FIGS. 7(a) to 7(d) and 18. As shown in FIG. 7(a), in one embodiment, the interior 181 of the dome 90 is characterized by internal and inward facing ribs 182. Note that each rib 182 presents a flat face 183 and an angled face 184. In this example, the reamer rotates in the direction of the arrow 185 so that the twisting motion of the citrus fruit half is resisted by the flat face 183 of each rib 182.

Figure 7B:
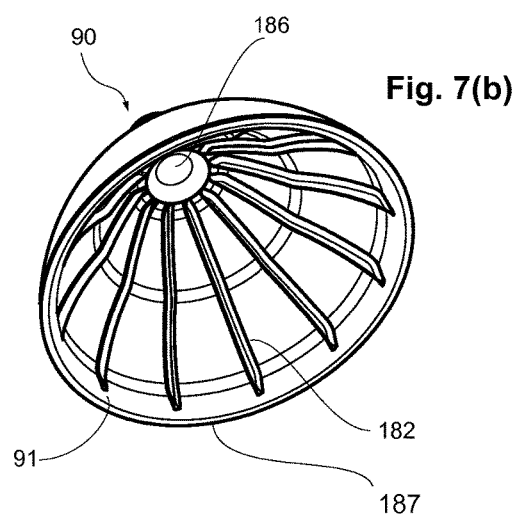

As shown in FIG. 7(b), the ribs 182 are generally straight and extend from the central portion 186 of the dome 90 toward the lower edge 187. The central portion 186 includes a cup like depression that is adapted to make contact with the pin 245 on the reamer. In this example, the ribs are generally straight but they may also include a slight twist or spiral path that drives the fruit half toward the central portion 186. As shown in FIG. 7(d), each rib 182 has a profile 160 that closely resembles the external profile of the ribs on the reamer. It is advantageous that the upper portion have a shape with a relatively sharp apex angle 162.

Figure 7C:
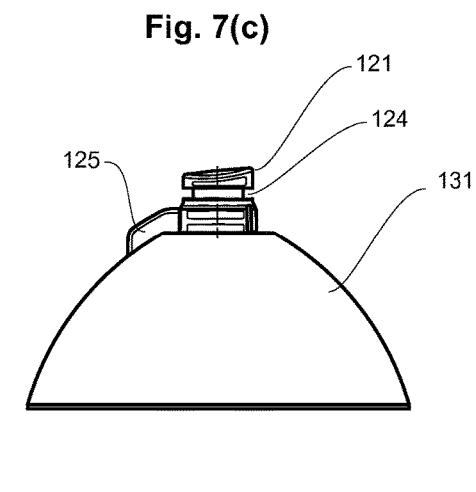
Figure 7D:
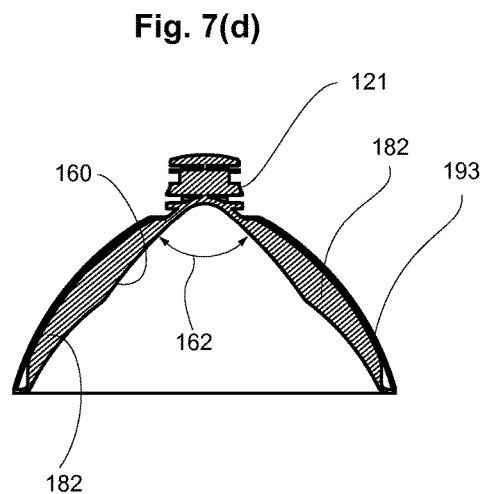

As shown in FIGS. 7(c) and (d) and 18, the removable fruit dome 90 may comprise a stub shaft component 121 having an alignment fin 125. The stub 121 may have a slot 124 for receiving an O-ring.

In other embodiments (FIG. 18) the stub 121 and alignment rib 125 are formed as a separate component having a mounting flange 130. The underside of the flange 130 may be provided with one or more small pins 136 to further stop rotation of the fruit. For ease of manufacture, a separate hemispherical shell 131 may be attached to the flange 130 and integral rib 122. The stub 121 is received by a cooperating opening 123 on the actuating arm located between the primary bend 75 and the grip 74. The integral alignment rib 125 engages a slot in the main arm so as to prevent the dome from rotating.

FIG. 7(d) also illustrates another construction method for a fruit dome. In this example an inner shell or insert made from nylon or another polymer has molded into it the features of the stub 121 and fin 125 etc. and also the internal edges 182. This inner shell is then joined to an outer shell, for example a metal outer shell 193 that provides rigidity and aesthetic appeal. The stub, or the stub and fin protrude from a top opening in the outer shell 193. In the alternative the fin may be formed into the outer shell.

Friction between the stub 121 and the opening 123 is enhanced by the presence of an O-ring 115 in the stub's slot 124 that is shown more clearly in FIGS. 7(c) and 12 to 15.

Interaction Between Reamer and Dome

Difficulty has arisen in the past in trying to fit different citrus fruit onto the reamer, resulting in interchangeable reamers being designed for different fruit. The profiles of the dome 90 and reamer 50 can be complimentary to maximize the versatility of the reamer 50 for different types of citrus fruit.

Figure 8A:
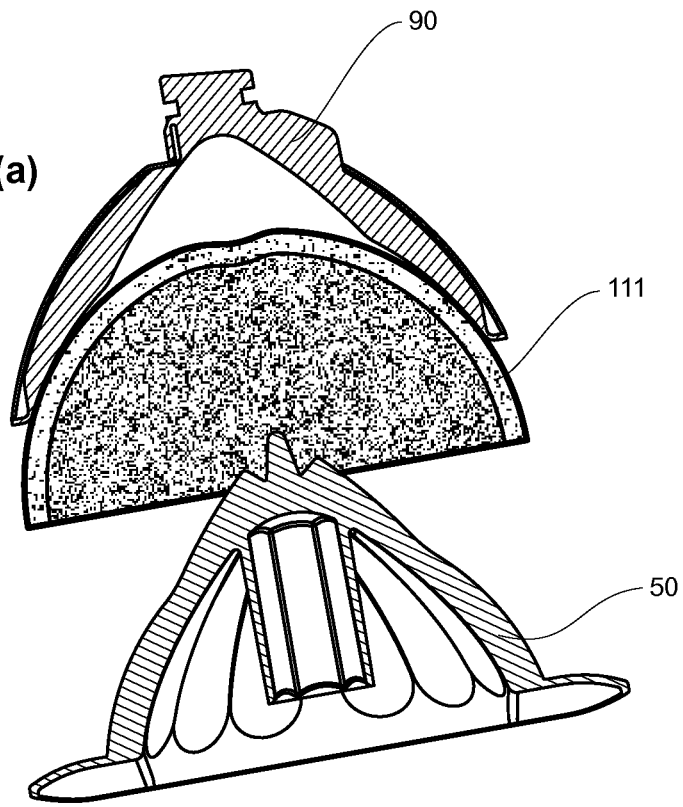
Figure 8B:
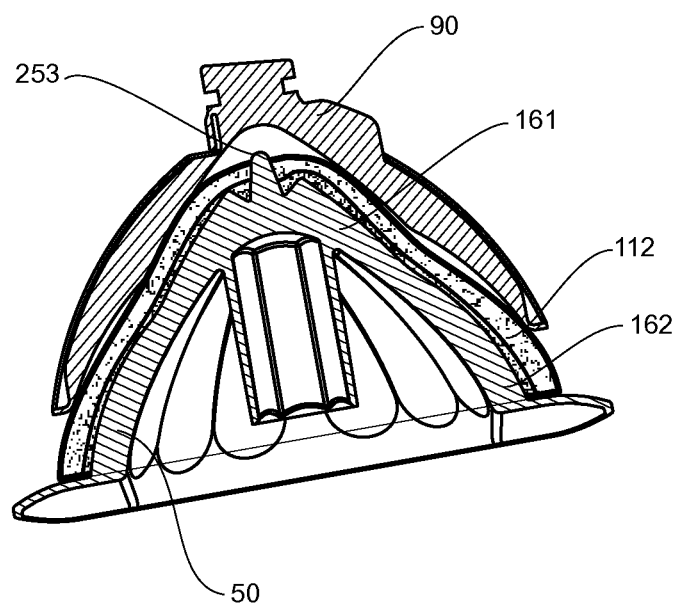

As shown in FIGS. 8(a) and 8(b), a grapefruit 111 is loaded onto the reamer pin 253 and subsequently lowered into position over the reamer 50 by pressure applied onto the dome 90. As shown in FIG. 8(b) the combination of reamer 50 and dome 90 are able to efficiently juice the large diameter grapefruit because the grapefruit rind 112 is able to conform to the external compound curvature shape of the reamer 50 without splitting. Note that the rind 112 essentially flexes in the area of the intermediate portion.

Figure 9A:
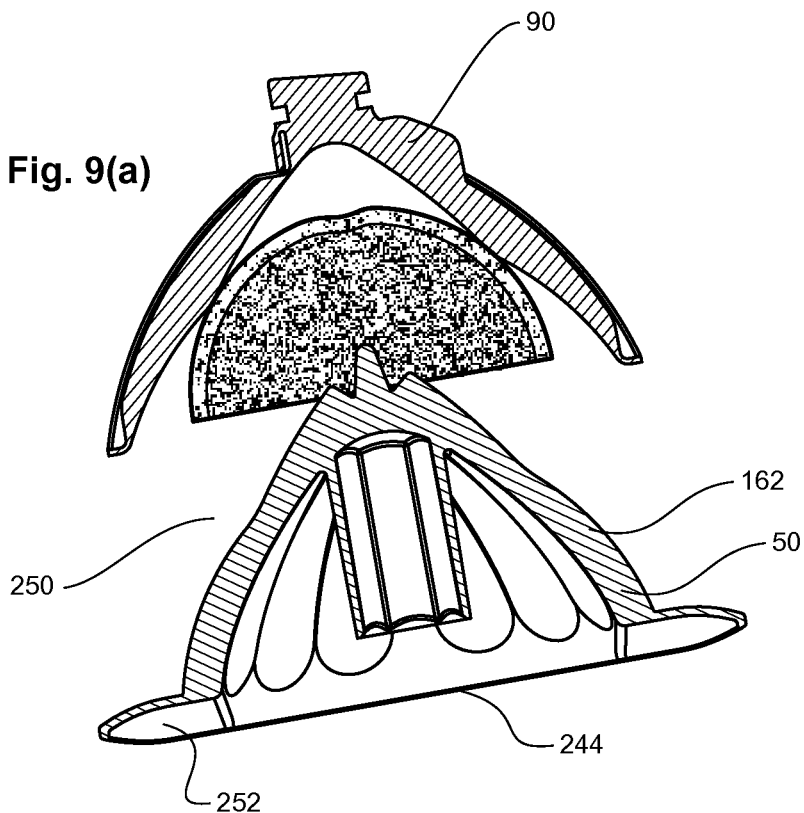
Figure 9B:
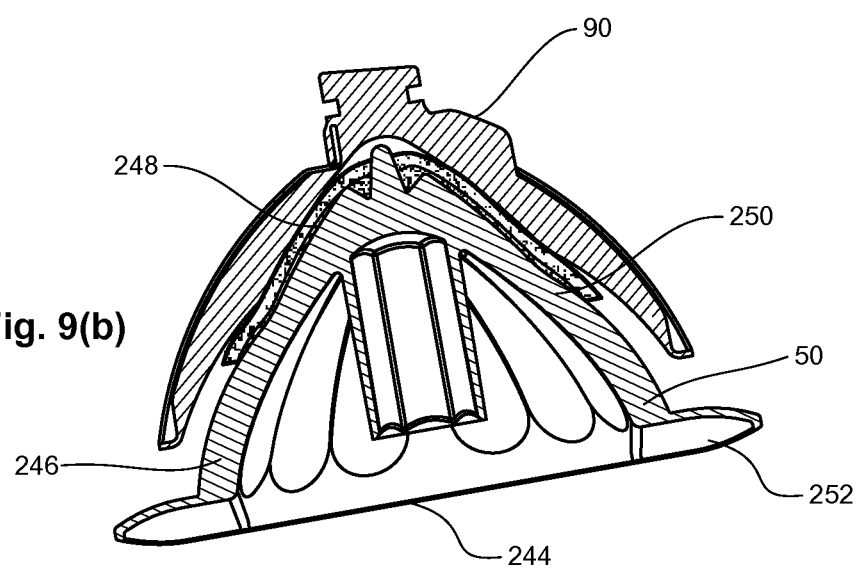

FIGS. 9(a) and 9(b) illustrate the same principles applied to an orange. The size of the orange is such that it conforms to the upper profile of the reamer 248, accommodates the transition portion 250 and extends only slightly into the larger diameter lower profile 246.

Figure 10A:
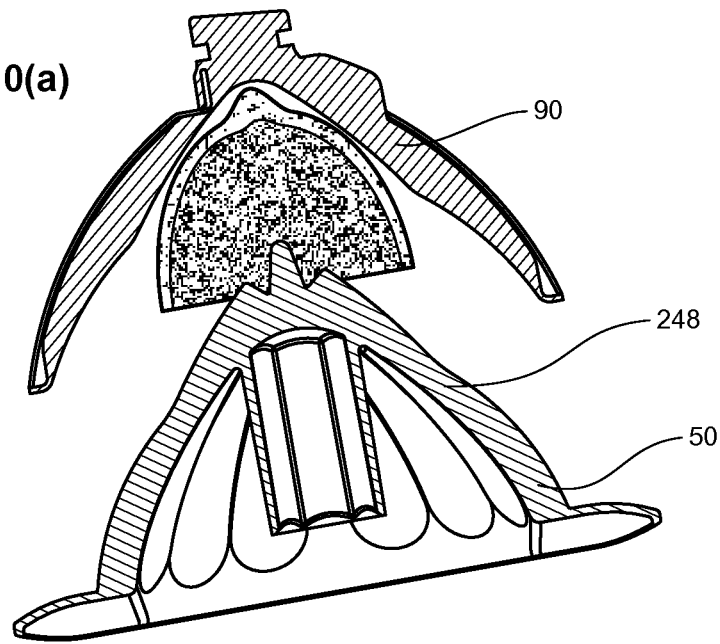
Figure 10B:
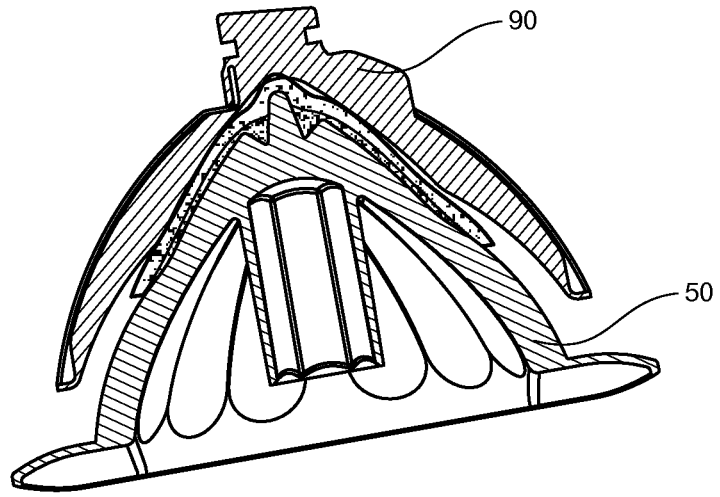

The juicing of a lemon is depicted in FIGS. 10(a) and 10(b). The nearly conical shapes of the upper profile of the reamer and dome are preferably optimized for and instrumental in ensuring that the lemon is stationery when the reamer turns and that the rind of the lemon does not tear during juicing. The configuration of the ribs on the reamer and dome also work in conjunction with the reamer profile to accommodate a wide range of citrus fruits for juicing.

Figure 11A:
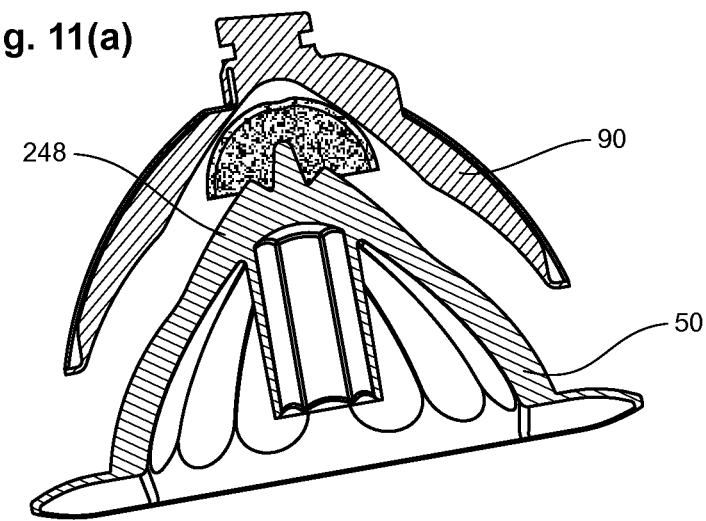
Figure 11B:
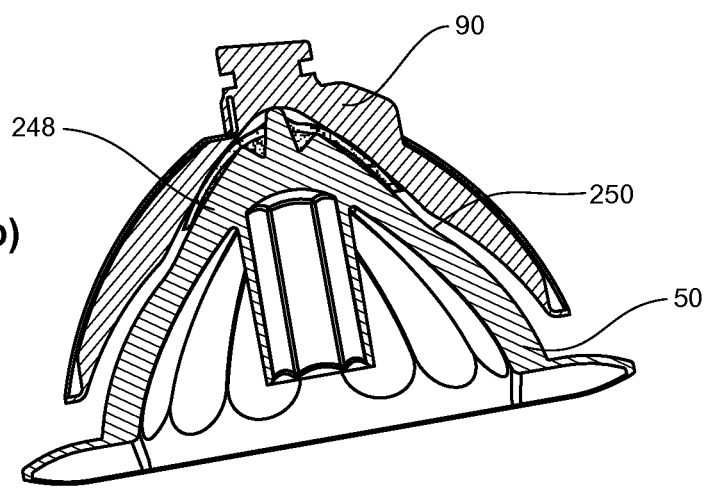

As shown in FIGS. 11(a) and 11(b) the upper profile 248 of the reamer is ideal for juicing small fruit such as limes. The lime conforms easily to the upper profile 248 and hardly reaches the transitional section 250.

In one embodiment, the dome 90 is carried by an actuating arm 70. As shown in FIG. 12, the cooperation of the moving parts of the actuator arm produce a complex path for the fruit dome, the path comprising arcuate and linear portions as described below.

Actuating Arm

In order to provide for efficient citrus juicing, a citrus fruit half 110 must be brought into contact with the rotating reamer 50. The present invention addresses certain ergonomic and safety issues by providing a manual actuating arm with components that are depicted variously in FIGS. 1, 2, 3 and 12 to 18. It will be understood that the components of the actuating arm are hinged or pivoted to one another. In practice, exactly which components carry male or female hinge or pivot parts is immaterial.

As shown in FIG. 1, the actuating arm includes a major pivot arm 80. In preferred embodiments, the major pivot arm 80 forms a channel with sidewalls 160. The major pivot arm 80 has lower pivot points 82 which are retained by and preferably within a lower portion 33 of a vertical well 34 that extends from the upper rim 24 of the housing 20. Upper pivot points 83 of the major pivot arm 80 attach to and pivot with a lower pivot connection 84 of the main arm 71.

The main arm 71 as shown in FIG. 18 extends from the pivot point 84 to a major, nearly ninety degree bend 73 from which the main arm 71 changes direction and extends, in a gentle curve, toward a grip portion 74. A second or upper pivot 75 is located between the lower pivot 84 and the grip 74 and more particularly between the lower pivot 84 and the major bend 73.

The main arm's second or upper pivot 75 connects to a first or upper end 101 of a minor pivot arm 100. A lower pivot connection 102 of the minor pivot arm 100 connects to a cooperating upper pivot bracket 103 (see FIG. 13) attached to the housing 20 or top cap 30.

The actuating arm may be biased away from the reamer, against the force of gravity, by a tension or balance spring 135 that interconnects and thus pulls the pivot arm 80 toward the housing (see FIGS. 1 and 13). This keeps the main arm in its upper or extended position while fruit is loaded. When the arm is left in the down position (way-point 10), the downward force of the arm assembly is also reduced by the spring 135 so that the motor is not unintentionally activated.

Thus collapsible quadrilateral hinge is formed having the following components: (a) the portion of the major pivot arm 80 between the lower and upper pivots 82, 83; (b) the portion of the main arm 71 between the lower and upper pivots 84, 75; the minor pivot arm 100 between its lower and upper pivots 101, 102; and that portion of the housing between the lower and upper pivots 82, 103.

This hinge acts as a four bar linkage where the pivot points 103 and 82 are fixed on the housing 20. As shown in FIG. 12, the major pivot arm 80 acts as a bar link rotating about pivot point 82 to define the lower extent of the movement of the actuating arm effectively forming a single pivot point for the actuating arm at pivot 83, when the pivot arm 80 is near the housing 20 as pivot points 83 and 103 effectively overlap. This allows the actuating arm to swing towards and away from the reamer for loading the fruit. Secondly, the minor pivot arm 100 acts as a bar link to limit the movement of the actuating arm to create the linear trajectory of the dome towards the reamer in cooperation with the limits of the four bar linkage (see FIG. 13).

The geometry established by the above components provides a number of advantages. It provides an arrangement that allows considerable pressure to be exerted on the fruit being pressed. It is compact given the mechanical advantage that is conferred. It provides a convenient arcuate or curved movement to the dome as the dome reaches the zenith of its path. This allows easy access to the reamer for loading of the fruit. It also provides a generally linear motion during that part of the dome's path when linear motion is required, that is, when the fruit dome begins to encapsulate the fruit and compresses it down around the reamer.

Fruit Dome Path

In use, as shown in FIGS. 12 to 17, the centre of the fruit dome 90 describes a path 105 defined by way-points 1-10. The course of the path 105 is determined by the orientation of the various moving parts that form the actuating arm. Importantly, the path 105 along the final way-points 5-10 describes a generally linear trajectory that is coincident with the axis of rotation of the juicing reamer 50. This ensures the fruit is not knocked from the top of the reamer as the arm moves into position and ensures an even gap and contact pressure with the fruit and therefore efficient juicing.

As shown in FIG. 12, the actuating arm has an initial fully open position in which the major pivot arm 80 is in close proximity to the housing 20, the upper and lower pivot points 82, 83 of the major pivot arm 80 lying in a roughly vertical plane. In this orientation, the minor pivot arm 100 is lodged within the channel formed in the actuating arm. In this position (way-point 1), the fruit dome 90 is still located above the juice collector 40 but is well clear of the reamer 50 for easy loading of the fruit. In particular, the lowest point of the rim of the fruit dome is located above the major opening of the juice collector so that any droplets falling from the fruit dome are collected by the juice collector 40. In this initial or fully open position, the quadrilateral hinge formed by the main housing and the components of the actuating arm is in a collapsed position. In this way, the initial movement of the fruit dome 90 resembles motion about a fixed pivot, thus producing a roughly arcuate path through way-points 1-5.

As shown in FIG. 13, the actuating arm has a terminal position in which the fruit dome is located directly over and concentric with the central mound 51 of the juicing reamer 50. Note that the central spike 55 contacts a cooperating recess 186 formed in the central interior of the fruit dome and thus creates a journal for the rotating pin 104 and a fixed gap between the dome and the mound. In this terminal position, the aforementioned quadrilateral hinge is in an expanded position and thereby imparting generally linear motion to the fruit dome. It will be appreciated that once the dome makes contact with the fruit that is loaded on the spike 104, further pressure against the handle portion 66 eventually causes the main shaft 28 of the motor-gearbox unit to actuate the micro switch 26 and thereby cause the motor to turn. Actuation of the motor also requires the disabling of a safety lock-out switch and the operation of the switch 194 will be explained below.

Safety Lock-Out

As shown in FIGS. 15 and 16 a switch actuator link 190 is located adjacent to the major pivot arm 80. It pivots about a lower axis of rotation 191. In preferred embodiments, a portion of the actuating arm makes contact with a cam surface 192 formed at an upper end of the switch actuator link 190. When the actuator arm is open and nearly open (way-points generally 1-5) the cam surface 192 makes contact with a normally closed micro switch 194 and thereby opens the micro switch's circuit disabling the activating micro switch 26 which is associated with the motor gearbox 29. Thus when fruit is loaded onto the reamer, the reamer does not start to rotate.

As shown in FIG. 16, when the fruit dome 90 has traveled at least to an intermediate way-point) along the path 105 (generally way-point 6, the switch actuator link is urged away from the switch 194 so that the micro switch 194 closes the circuit which enables the activation of the micro switch 26. This allows pressure on the main shaft 28 to activate the motor in the motor gearbox 29. In preferred embodiments, the activating micro switch 26 is only effective during the linear portion of path 105.

Juice Collector and Spout

As shown in FIGS. 19-23, juice in the juice collector 40 exits the device through a spout 42 and is collected for consumption.

Figure 19B:
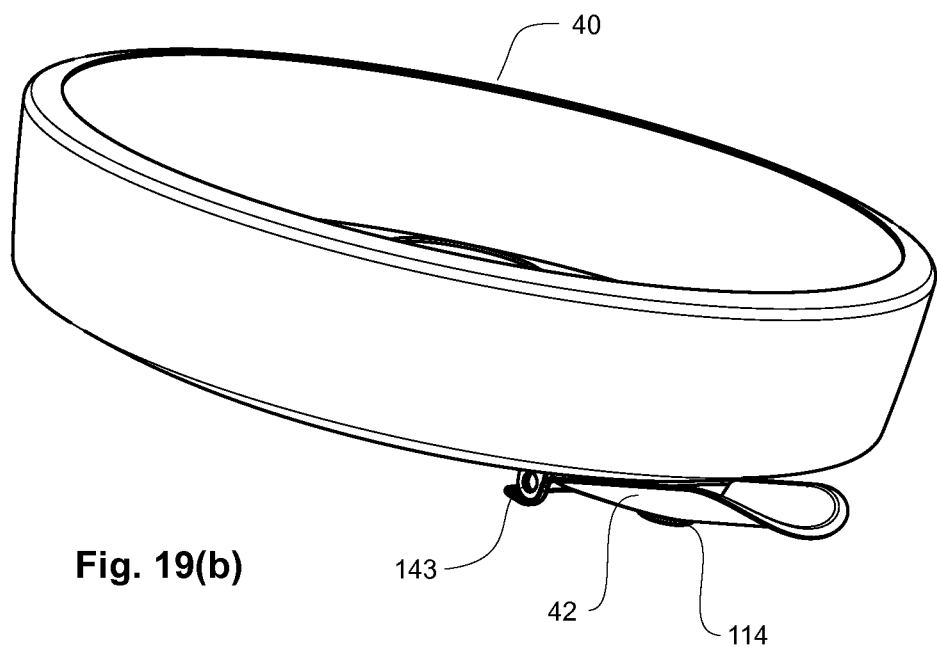

As shown in these examples, the spout 42 is fabricated from a pressed stainless steel sheet. The rear portion of the spout 42 forms a support and pivot axis 117 that is retained by a bracket 118 that is mounted under or formed integrally with the collector 40. The spout forms a shallow "U" in cross section as shown in FIG. 19. For the user's convenience and safety, the forward portion of the spout 42 is rounded 119. The spout includes a central opening 47 that received a round elastomeric seal 114 that is located between the pivot axis 117 and the forward portion 119 of the spout.

Figure 20B:
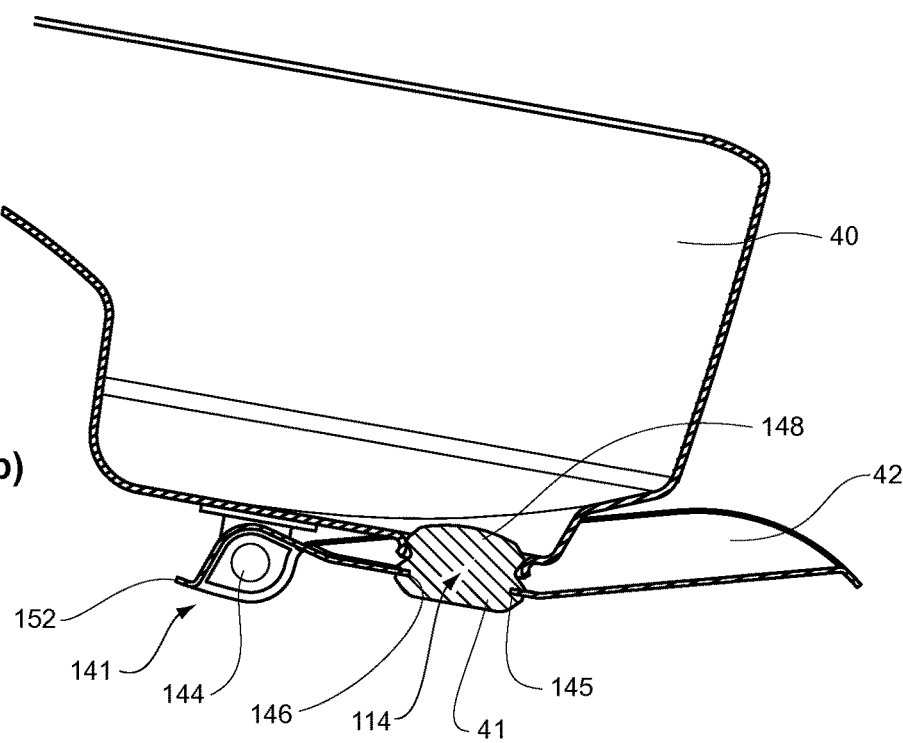

As shown in FIGS. 20 and 21, the rear portion 141 of the spout 42 is pressed-formed so as to define lateral spout brackets 142 (see FIG. 20). The spout brackets 142 may be pivotally affixed to the lateral ends of the collector-mounted bracket 143 by rivets 144 or by other means. FIGS. 20 and 21 also depict the central opening 145 that receives the elastomeric seal 114. As shown in FIG. 13, unless the seal 114 is inserted into the dispensing opening 146 of the collector 40, juice will run through the opening 146 and down the spout 42. As shown in FIG. 20, the elastomeric seal 114 is adapted to occupy the opening 146 and be retained by it. In preferred embodiments, the seal 114 includes an optional waist or central area of reduced diameter 147 that is smaller in diameter than a cap portion 148 of the seal. The waist 147 provides good sealing action and tactile feedback when it seats into the opening 146. In some preferred embodiments, the dispensing opening 146 has a rounded interior edge 149 that is smaller than the diameter of the cap of the seal 148 but large enough to admit the tapered edges 150 of the cap 148 when the spout 42 is urged firmly toward the collector 40. FIGS. 20 and 21 also illustrate that the seal 114 can be retained by the spout by providing a circumferential groove 151 below the waist 147 in the seal 114 for a tight fit between seal 114 and spout opening 146.

As shown in FIG. 21(*a*), the spout 42 has a fully opened position. In this position, the spout 42 may be stabilized against the collector 40 by a rear edge 152 of the spout to prevent over-rotation. The fully open position provides easy access to the seal area, spout and dispensing opening 146 for cleaning. As shown in FIG. 21(*b*), the spout 42 is free to rotate through a range of intermediate positions between the fully opened position and the closed position. As shown in FIG. 22(*c*), the spout has a closed or sealed position that occurs when the seal 114 is restrained against gravity by the collector opening 146. In this position, juice cannot escape the opening 146 and the spout 42 will not disengage from the opening 146 under the influence of gravity alone. A slight downward finger pressure on the spout 42 will allow the cap 148 of the seal 114 to deform and thereby pass through the opening 146, As shown in FIG. 22, the spout 42 preferably includes a circumferential edge 153 which is pressed into the spout and which rigidises it. Also shown in this figure is the bottom portion 154 of the seal 114 which is larger in diameter than the spout opening 146 and which is visible against the underside 155 of the spout 42.

While the invention has been disclosed with reference to particular details of construction, these should be understood as having been provided by way of example and not as limitations to the scope or spirit of the invention.

The invention claimed is:

1. A motorised citrus press having two switches for safety purposes comprising:
   a housing containing a motor for driving a rotating reamer;
   the housing having attached to it an actuating arm;
   the arm being hinged to the housing at one end and having a handle at a free end;
   the arm supporting for movement toward the reamer, a fruit dome, having a path toward the reamer;
   the movement of the arm causing an activation of a first switch that is associated with the motor;
   the reamer being mechanically associated with a second switch such that pressure on the reamer activates the second switch;
   the first switch is only activated when the fruit dome has travelled at least to an intermediate waypoint along the path toward the reamer;
   the motor receiving electrical power for the reamer only when both the first and second switches cooperate.

2. The press of claim 1, wherein:
   the first and second switches are microswitches.

3. The present claim 1, wherein:
   a portion of the arm contacts a cam surface on a switch actuator link, the switch actuator link acting to activate or deactivate the first switch.

4. The press of claim 1, wherein:
   the dome has a path that becomes generally linear as the dome approaches the reamer and the first switch only cooperates with the second switch to cause rotation of the reamer when the path of the dome is generally linear.

5. The press of claim 1, wherein:
   the arm is attached to the housing by a collapsible quadrilateral hinge.

6. The press of claim 1, wherein:
   the arm is biased away from the reamer, against the force of gravity, by a balance spring for keeping the arm in an extended position while fruit is loaded.

7. The press of claim 1, wherein:
   a balance spring reduces a downward force of the arm so that the motor is not unintentionally activated.

8. A motorised citrus press having two switches for safety purposes comprising:
   a housing containing a motor for driving a rotating reamer;
   the housing having attached to it an actuating arm;

the arm being hinged to the housing at one end and having a handle at a free end;

the arm supporting for movement toward the reamer, a fruit dome, having a path toward the reamer;

the movement of the arm causing an activation of a first switch that is associated with the motor;

the reamer being mechanically associated with a second switch such that pressure on the reamer activates the second switch;

the dome having a path that becomes generally linear as the dome approaches the reamer and the first switch only cooperates with the second switch to cause rotation of the reamer when the path of the dome is generally linear;

the motor receiving electrical power for the reamer only when both the first and second switches cooperate.

9. The press of claim 8, wherein:
the first and second switches are microswitches.

10. The press of claim 8, wherein:
the first switch is only activated when the fruit dome has travelled at least to an intermediate waypoint along the path toward the reamer.

11. The press of claim 8, wherein:
a portion of the arm contacts a cam surface on a switch actuator link, the switch actuator link acting to activate or deactivate the first switch;

the dome having a path the becomes generally linear as the dome approaches the reamer and the first switch only cooperates with the second switch to cause rotation of the reamer when the path of the dome is generally linear.

12. The press of claim 8, wherein:
the arm is attached to the housing by a collapsible quadrilateral hinge.

13. The press of claim 8, wherein:
the arm is biased away from the reamer, against the force of gravity, by a balance spring; for keeping the arm in an extended position while fruit is loaded.

14. The press of claim 8, wherein:
a balance spring reduces a downward force of the arm so that the motor is not unintentionally activated.

15. A motorised citrus press having two switches for safety purposes comprising:
a housing containing a motor for driving a rotating reamer;

the housing having attached to it an actuating arm;

the arm being hinged to the housing at one end by a collapsible quadrilateral hinge and having a handle at a free end;

the arm supporting for movement toward the reamer, a fruit dome, having a path toward the reamer;

the movement of the arm causing an activation of a first switch that is associated with the motor;

the reamer being mechanically associated with a second switch such that pressure on the reamer activates the second switch;

the motor receiving electrical power for the reamer only when both the first and second switches cooperate.

16. The press of claim 15 wherein:
the first switch is only activated when the fruit dome has travelled at least to an intermediate waypoint along the path toward the reamer.

17. The present claim 15, wherein:
a portion of the arm contacts a cam surface on a switch actuator link, the switch actuator link acting to activate or deactivate the first switch.

18. The press of claim 15, wherein:
the dome has a path that becomes generally linear as the dome approaches the reamer and the first switch only cooperates with the second switch to cause rotation of the reamer when the path of the dome is generally linear.

19. The press of claim 15, wherein:
the arm is biased away from the reamer, against the force of gravity, by a balance spring for keeping the arm in an extended position while fruit is loaded.

* * * * *